US012508514B2

(12) United States Patent
Fukui

(10) Patent No.: US 12,508,514 B2
(45) Date of Patent: Dec. 30, 2025

(54) MATCH-MAKING SYSTEM, PROGRAM, AND SERVER

(71) Applicant: BANDAI CO., LTD., Tokyo (JP)

(72) Inventor: Tomonori Fukui, Tokyo (JP)

(73) Assignee: BANDAI CO., LTD., Tokyo (JP)

(*) Notice: Subject to any disclaimer, the term of this patent is extended or adjusted under 35 U.S.C. 154(b) by 305 days.

(21) Appl. No.: 18/252,877

(22) PCT Filed: Nov. 12, 2021

(86) PCT No.: PCT/JP2021/041811

§ 371 (c)(1),
(2) Date: May 13, 2023

(87) PCT Pub. No.: WO2022/102762

PCT Pub. Date: May 19, 2022

(65) Prior Publication Data

US 2024/0017180 A1 Jan. 18, 2024

(30) Foreign Application Priority Data

Nov. 13, 2020 (JP) ................................ 2020-189638

(51) Int. Cl.

*A63F 13/75* (2014.01)
*A63F 13/53* (2014.01)

(Continued)

(52) U.S. Cl.

CPC ............ *A63F 13/795* (2014.09); *A63F 13/53* (2014.09); *A63F 13/75* (2014.09); *A63F 13/87* (2014.09); *A63F 2300/5553* (2013.01)

(58) Field of Classification Search

None

See application file for complete search history.

(56) References Cited

U.S. PATENT DOCUMENTS

| | | | | |
|---|---|---|---|---|
| 2014/0168348 | A1 | 6/2014 | Kubota et al. | |
| 2014/0329602 | A1 | 11/2014 | Hisaoka et al. | |
| 2021/0331076 | A1* | 10/2021 | Labate .................... | A63F 13/48 |

FOREIGN PATENT DOCUMENTS

| | | | |
|---|---|---|---|
| CN | 106156243 | A | 11/2016 |
| CN | 106462916 | A | 2/2017 |

(Continued)

OTHER PUBLICATIONS

WIPO, International Search Report for International Application No. PCT/2021/041811, Jan. 18, 2022.

(Continued)

*Primary Examiner* — Damon J Pierce
(74) *Attorney, Agent, or Firm* — IMAIZUMI IP LAW, PLLC; Toshikatsu Imaizumi

(57) ABSTRACT

In order to realize communication with improved comfortability, a match-making system for provides communication through avatars arranged in a virtual space and a service of match-making for a match game, comprises a first accepting unit which accepts a connection from an information communication terminal of a user of the service; an assignment unit which assigns a first kind avatar, which is an object of match-making for the match game, to the user of the information communication terminal, which is connected thereto; a management unit which movably arranges the first kind avatar assigned to the user by the assignment unit and a second kind avatar, which is not subject to the match-making for the match game, in the virtual space, and manages states thereof; an action control unit which controls an action of the second kind avatar in the virtual space; and a display control unit which causes a display unit of the connected information communication terminal to display the virtual space, based on state information of the first kind avatar and the second kind avatar managed by the management unit so that the first kind avatar and the second kind (Continued)

avatar are distinguishable, wherein execution authority for an action related to establishment of the match-making for the match game with another first kind avatar, is given to the first kind avatar, instead of not giving the execution authority of the action related to establishment of the match-making for the match game with the first kind avatar arranged in the virtual space, execution authority for an action to arbitrarily eject the first kind avatar from the virtual space, is given to the second kind avatar, and the management unit stops arranging the first kind avatar, which is subject to an ejection, in the virtual space when an action for the ejection is performed by the action control unit.

14 Claims, 14 Drawing Sheets

(51) Int. Cl.

| | |
|---|---|
| ***A63F 13/795*** | (2014.01) |
| ***A63F 13/87*** | (2014.01) |

(56) References Cited

FOREIGN PATENT DOCUMENTS

| | | | |
|---|---|---|---|
| CN | 110755850 | A | 2/2020 |
| CN | 111330265 | A | 6/2020 |
| CN | 111714882 | A | 9/2020 |
| JP | 2007-325630 | A | 12/2007 |
| JP | 2008-229126 | A | 10/2008 |
| JP | 2011101775 | A | 5/2011 |
| JP | 2013-088878 | A | 5/2013 |
| JP | 2019037305 | A | 3/2019 |
| JP | 2020-157147 | A | 10/2020 |
| KR | 20040070457 | A | 8/2004 |

OTHER PUBLICATIONS

WIPO, Written Opinion for International Application No. PCT/2021/041811, Jan. 18, 2022.

Japan Patent Office, Office Action for Patent Application No. 2020-189638, Jan. 6, 2022.

Taiwan Patent Office, Office Action for Patent Application No. 110138658, Dec. 6, 2022 (A machine translation is attached hereto).

Japan Patent Office, Office Action for Patent Application No. 2022137058, Mar. 7, 2025.

China National Intellectual Property Administration (CNIPA), Office Action for Chinese Patent Application No. 202111286838, Nov. 22, 2024 (Machine Translation is Attached).

https://www.bilibili.com/video/BV1sE411v7KQ/?spm_id_from=333.337.search-card.all. click&vd_source=746f85fb79b0bc9c9a2aa91074b72dfe, "People who play QQ Dance usually have a high level of etiquette/cultivation." (Cited in Chinese Office Action), Nov. 9, 2019.

Japan Patent Office, Office Action for Patent Application No. 2022137058, Dec. 6, 2024.

* cited by examiner

FIG. 9A
FIG. 9B
Win the match with
DDD
Congratulations!
1801 WIN
3 LOSE
OK
Lose the match with
CCC
I'm sorry.
256 WIN
82 LOSE
OK

FIG. 13
CCC
Win first place in first and second periods!
1800 WIN
3 LOSE
Guide to a table
Forcible ejection

MATCH-MAKING SYSTEM, PROGRAM, AND SERVER

TECHNICAL FIELD

The present invention relates to a match-making system, a program, and a server and specifically relates to an electronic game which realizes online game match of a multiple players.

BACKGROUND

There are game systems having a configuration in which avatars respectively corresponding to users are movably arranged in a virtual space, thereby realizing communications between the users via the avatars in the virtual space (Patent Document 1).

PRIOR ART

Patent Documents

[Patent Document 1] Japanese Patent Application Publication No. 2013-088878

SUMMARY

Technical Problem

However, in the system disclosed in Patent Document 1, since it is possible to communicate with each other without facing each other, there are some aspects in which users, who do not follow the rules and manners, appear.

It is an object of the present invention to provide a match-making system, a program and a server for realizing communication with improved comfortability.

Solution to Problem

The match-making system according to the present invention relates to a match-making system for providing communication through avatars arranged in a virtual space and a match-making service for a match game. The match-making system comprises a first accepting unit which accepts a connection from an information communication terminal; an assignment unit which assigns a first kind avatar, which is an object of match-making for the match game, to a user of an information communication terminal which is currently connected; a management unit which movably arranges the first kind avatar, which is assigned by the assignment unit to the user and a second kind avatar, which is not subject to the match-making for the match game, in the virtual space, and which manages states thereof, an action control unit which controls an action of the second kind avatar in the virtual space; a display control unit which causes a display unit of the currently connected information communication unit to display the virtual space so that the first kind avatar and the second kind avatar are identifiable, based on information of the state of the first kind avatar and that of second kind avatar, which are managed by the management unit, wherein the first kind avatar is given execution authority of an action related to establishment of the match-making for the match game with another first kind avatar arranged in the virtual space, and the second kind avatar is given action execution authority for arbitrarily ejecting a first kind avatar arranged in the virtual space instead of not being given the execution authority of the action related to the establishment of match-making for the match game with the first kind avatar arranged in the virtual space, and the management unit stops arranging the first kind avatar, which is an object of the ejection, in the virtual space.

Advantageous Effect of Invention

According to the present invention, it is possible to realize communication with improved comfortability.

DETAILED DESCRIPTION

[EMBODIMENT 1] Detailed explanation of the embodiments will be given below referring to drawings attached hereto. It should be noted that the embodiments describe5*d* below do not limit the claimed invention. In addition, all the combinations of features described in the embodiments are not necessarily indispensable elements. Two or more features of a plurality of the features described in the embodiments may be arbitrarily combined. Further, the same reference numbers are respectively given to the same elements or similar elements and duplicate explanation therefor will be omitted.

In an embodiment described below, as an example of a match-making system, the present invention is applied to a system which provides a service for realizing match-making for a match game provided in an outside service and is played by two players, via a virtual space. However, the present invention may be applied to a system which can be realized by any device structure capable of match-making for a match game provided in an outside service, via such a virtual space.

In addition, the present specification, “a user” means one who uses a service (match-making service) provided by a server in the present match-making system, and “a player” means a user who is playing a match game using “an outside service” or a user who has been determined to be a player of the match game.

Figure 1:
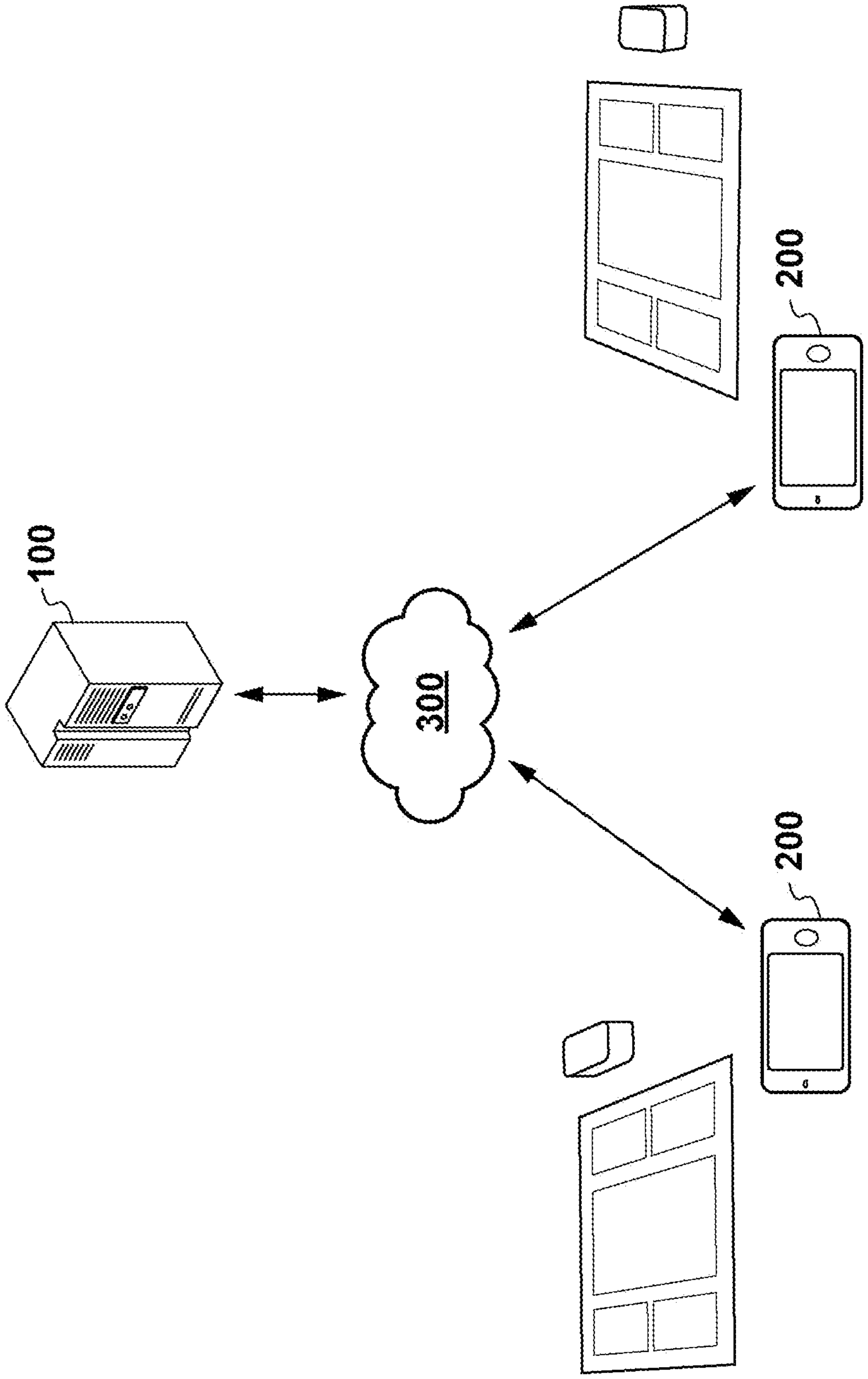
FIG. 1 is a diagram showing an example of a configuration of a match-making system according to embodiments of the present invention and a modified example.

<<Configuration of Match-making System>> FIG. 1 is a diagram showing a configuration of the match-making system according to the present embodiment. As shown in the figure, in the match-making system, a server 100 and two or more user terminals 200 are configured so as to be able to be connected to and communicate with each other via a network 300. The server 100 provides a match-making service for match-making between users of the user terminals 200 as players of a match game, which is realized by an outside service.

In the present embodiment, described herein is the outside service, which assists execution of the match game among remote players and which does not have a free match-making type of match-making function in which match-making between players are performed by extracting the predetermined number of players before the service is provided. For, example, a video chat function using a camera and a microphone of each user terminal 200 becomes available when the number of players required for the match game, gain access to a room (access point) created by a player who serves as a host. The outside service may be a service for realizing a game play of a trading card game (TCG) wherein such a trading card game is advanced while status of each of game items placed in the environment (actual world) where the players exist, is shared by the players.

However, the present invention is not limited to such an example, and the outside service may be any service as long as a match game play is provided among user terminals 200 of a plurality of registered players via a network 300. The outside service may be a service for realizing other kinds of match games. The outside service is not limited to those which do not have a free match-making type of match-making function. The outside service may be any service as long as it includes, as an aspect of the match-making function, a custom match-making method in which match-making among users of the user terminals 200 connected to a specified access point is performed for players.

Although detailed description will be given later, when a user of the match-making service connects the user terminal 200 to be used, to the server 100, the user is allowed to view a virtual space (hereinafter referred to as a room) for the match-making service where an avatar corresponding to each user is arranged. When the user moves the avatar arranged in the room by performing an operation thereto and the user communicates with another user (by text chat etc.) via the avatar, match-making with an opponent(s) for the match game provided by the outside service can be performed.

In addition, the outside service may have a function of allowing users to watch an ongoing match game so that after knowing avatars, which are in a match playing state in the room, the users may watch the ongoing match game played by users associated with the avatars.

The match-making system according to the present embodiment is configured so that such match-making can be performed for two or more game titles. The two or more game titles may be respectively provided by different outside services or some of or all the game titles may be provided by one outside service. As described later in detail, a room is independently set for each game title in order to improve efficiency of match-making, and avatars corresponding to users are arranged in the room for the game title which the users desire to play. In addition, the upper limited number of avatars arranged in each room is set. For a game title in which the number of users is large, two or more kinds of rooms are provided to be selectable in order to secure match-making opportunities in each room.

Figure 2:
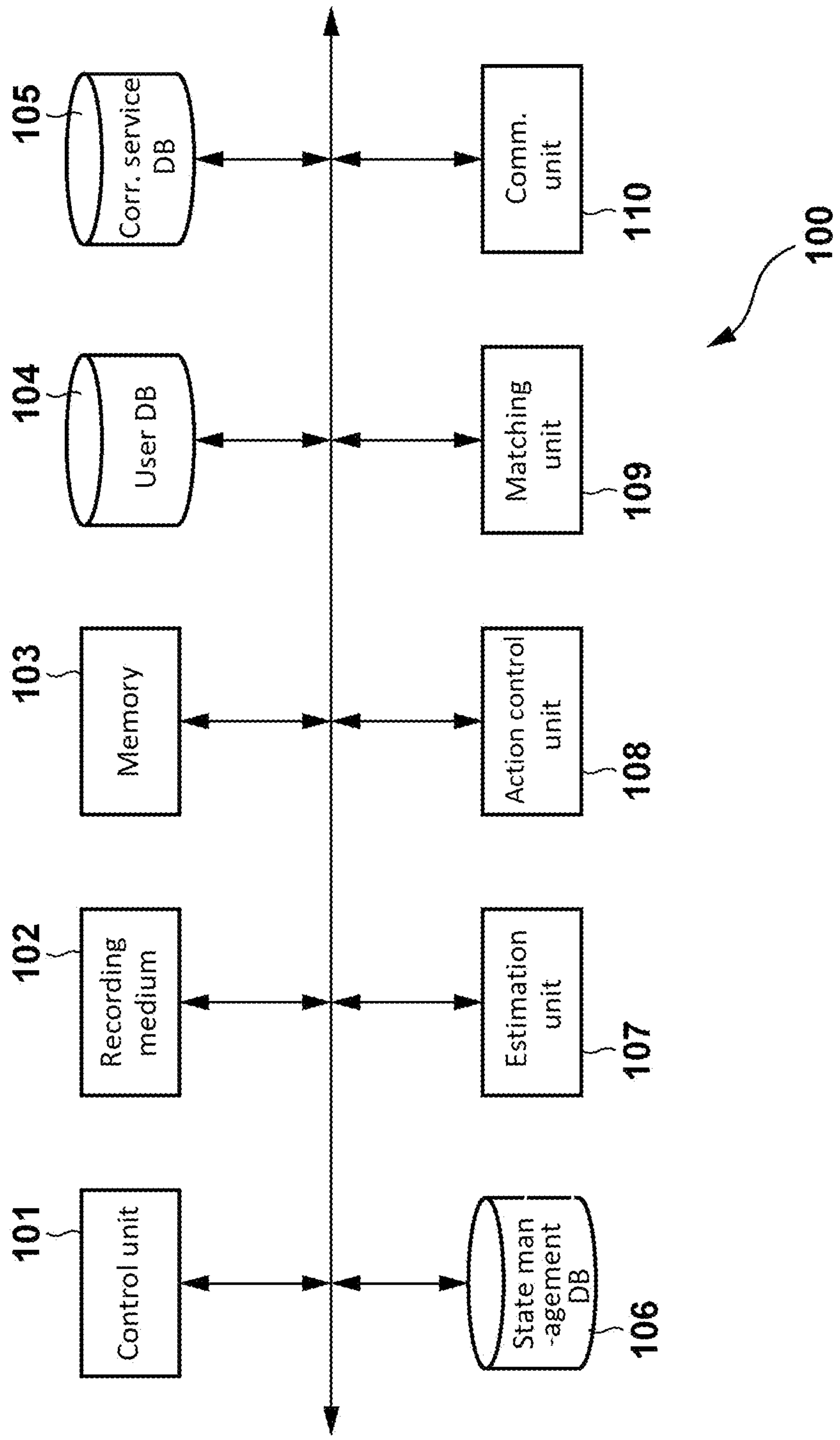
FIG. 2 is a block diagram showing an example of a functional configuration of a server 100 according to the embodiments of the present invention and the modified example.

<Configuration of Server 100> A functional configuration of the server 100 according to the present embodiment, will be explained referring to a block diagram shown in FIG. 2.

A control unit 101 comprises a CPU, and controls an operation of each block of the server 100. Specifically, the control unit 101 reads out an operation program of each block which is recorded in, for example, a recording medium 102, and develops and executes it in a memory 103, thereby controlling the operation of each block.

The recording medium 102 is, for example, a recording device such as a nonvolatile memory and HDD etc., which is capable of permanently holding data. The recording medium 102 stores information such as parameters etc. required for the operation of each block in addition to the operation program of each block that the server 100 has. A memory 103 is a recording device such as a volatile memory etc., which is used for temporarily storing data. The memory 103 is used as not only a developing area for the operation program of each block but also a storage area for temporarily storing data etc. outputted in the operation of each block.

Figure 14A:
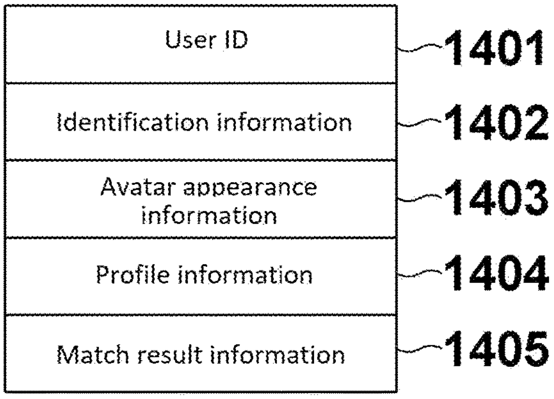
FIGS. 14A-14D show an example of data structure of various pieces of information used in the match-making system according to the embodiments of the present invention and the modified example.

A user DB 104 is a data base for managing information (user information) related to users of the match-making service in the match-making system according to the present embodiment. As shown in FIG. 14A, the user information may be configured to include identification information 1402 such as email address etc. by which a user can be uniquely identified; avatar appearance information 1403 for identifying an appearance of an avatar associated with the user; profile information 1404 which indicates a profile set about the user; and match result information 1405 which indicates match results of match games played by the user in the outside service, in which, these pieces of information are associated with the user ID 1401. In the match-making system according to the present embodiment, when each user performs a connection operation for the user terminal 200 for the first time, that is, for the first time use of the match-making service, such a user needs to be registered (the identification information of the user is associated with the user ID 1401), and the user information regarding the user is added to the user DB 104. In addition, the service will be provided at the next connection, using the above-stated user information by inputting the identification information of the user.

Figure 14B:
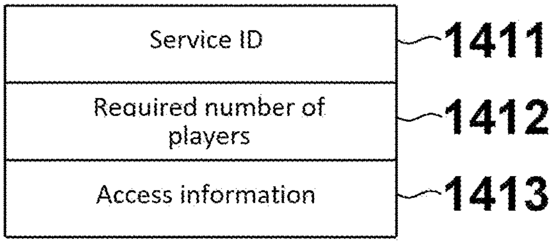

A correspondent service DB 105 is a data base for managing information regarding outside services (outside service information) for which match-making is performed in the match-making system according to the present embodiment. As shown in FIG. 14B, the outside service information may include a required player number 1412 which indicates the number of players required for game play in a match game provided in the outside service, and access information 1413 which indicates a connection destination of the outside service used at time of information registration of the matched players (a creation request of the connection destination of the match game). The required player number 1421 and the access information 1413 are associated with service ID 1411 used for uniquely identifying an outside service. The outside service information is configured to include information of the outside services which can be cooperated, and is added to the correspondent service DB 105.

Figure 14C:
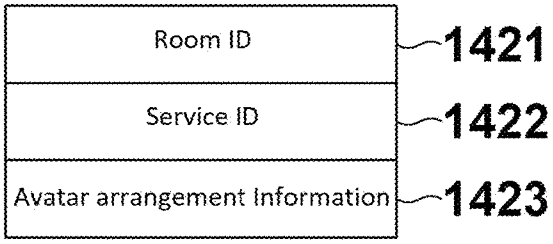

A status management DB 106 manages state management information which indicates a state of each virtual space in which the match-making function is provided in the match-making system according to the present embodiment. As shown in FIG. 14C, the state management information is configured to include service ID 1422 which identifies the outside service providing a match game for which match-making is performed in a room, and avatar arrangement information 1423 which indicates a state of each avatar arranged in the room. The service ID 1422 and the avatar arrangement information is associated with a room ID 1421 which uniquely identifies the room.

Figure 14D:
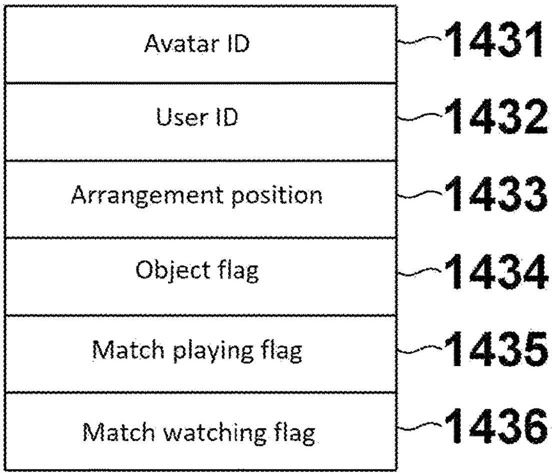

In this embodiment, as shown in FIG. 14D, the avatar arrangement information 1423 to be managed regarding one avatar, is configured to include the user ID 1432 of a user who is associated with the avatar, an arrangement position 1433 of the avatar in the room, an object flag 1434 which indicates whether or not the avatar is an object for match-making (in a stand-by state for match-making); a match playing flag 1435 which indicates whether or not the avatar (or a user associated with the avatar) is in execution of a match game (currently playing the match) in the outside service corresponding to the room; and a game watching flag 1436 which indicates whether or not the other avatars in the room are watching the currently executed match game, wherein the user ID 1432, the arrangement position 1433, the object flag 1434, the match playing flag 1435, and the game watching flag 1436 are associated the avatar ID 1431. The object flag 1434 and the match playing flag 1435 and the match watching flag 1436 may be in form of logic type information.

During a period when the avatar of the user is arranged in the room, the avatar arrangement information 1423 is updated in response to an operation performed by the user on the user terminal 200 or by periodically obtaining a state thereof. Although explained in detail later, the avatar whose state is managed based on the avatar arrangement information 1423 is not limited to such an avatar associated with a user (user avatar), and may include an avatar arranged by an administration side of the match-making service (administration avatar). In the present embodiment, the administration avatar is explained as a so-called NPC (Non-Player character), that is, the administration avatar is not associated with any user, and an action of the administration avatar is not controlled by an operation performed on the user terminal 200. In addition, the user ID 1432 of the avatar arrangement information 1423 regarding such an administration avatar may be null or an ID which is not assigned to any user.

An estimation unit 107 estimates whether a user of the match-making service stays in a state where the user desires to play a match game, based on transition of a state of an avatar corresponding to each user in the room. Although the estimation performed by the estimation unit 107 will be explained in detail later, the match-making system according to the present embodiment has a system where such a state is checked as required, and a support is provided until the match game is established, so that such a user can easily play the match game even if the user is passive with respect to communications between users.

An action control unit 108 controls an action of an administration avatar arranged in each room. As described above, since an action of the administration avatar is not controlled by an operation performed on the user terminal 200, the action control unit 108 performs a control thereof in the room based on a state of the arranged avatar(s).

A match-making unit 109 performs match-making among users who are respectively associated with a predetermined number of the avatars (the number of players required for a match game of the outside service) in a stand-by state for match-making in a room. In addition, the match-making unit 109 registers information of users associated with the matched avatars in order to set a connection destination of a new match game in the outside service corresponding to the room. That is, in the match-making system according to the present embodiment, the match-making unit 109 takes on a role of acting for users to follow procedures (including determination of an opponent(s), registration procedure regarding a connection destination setting) in case where the user plays a match game by directly using the outside service.

A communication unit 110 is a communication interface for communicating with other devices which the server 100 has. The communication unit 110 establishes connection with outside devices through the network 300 by a predetermined communication method regardless of wire or wireless, and performs transmission and reception of data.

Figure 3:
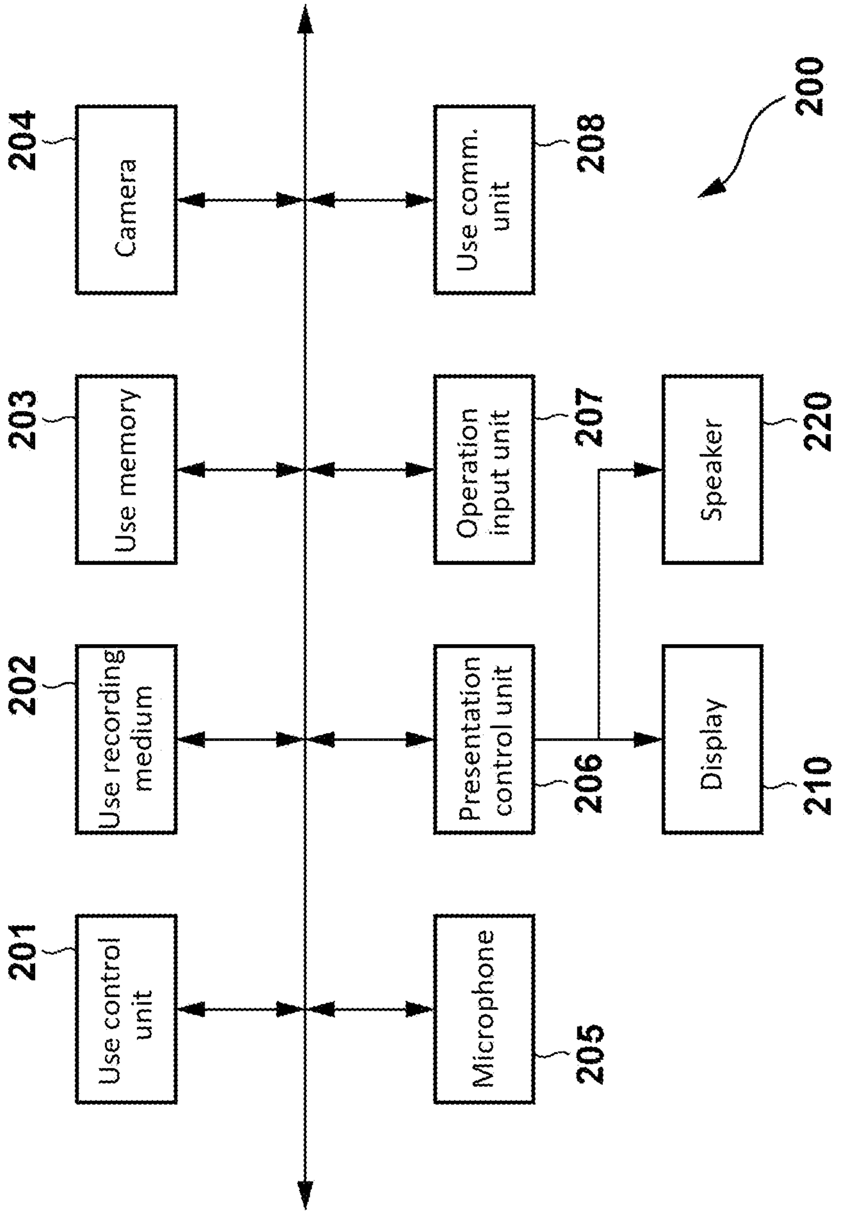
FIG. 3 is a block diagram showing an example of a functional configuration of a user terminal 200 according to the embodiments of the present invention and the modified example.

<Functional Configuration of User terminal 200> Next, a functional configuration of the user terminal 200 according to the present embodiment will be explained referring to a block diagram shown in FIG. 3. In the present embodiment, a smart phone having a camera and a microphone is exemplified as the user terminal 200, which realizes a match play of a TCG between remote players in the above-described example. However, it is apparent that the user terminal 200 is not limited to such a smart phone in implementation of the present invention. That is, as long as a device used as the user terminal 200 has an information communication function and indispensable structures required for a match game to be realized through the outside service, any device can be used. The user terminal 200 is not limited to a device having all structures as initial configuration, such as a smart phone. In addition, in description of the functional configuration of the user terminal 200, structural elements of the user terminal 200 for realizing functions similar to those realized by the structural elements of the server 100 are represented with a prefix of "use" in order to distinguish the structural element of the server 100 therefrom.

A use control unit 201 is, for example, a CPU, and controls an operation of each block of the user terminal 200. Specifically, the use control unit 201 reads out an operation program of each block and a program relating to a support application, which are recorded in, for example, a use recording medium 202, and develops and executes it in a use memory 203, thereby controlling the operation of each block.

The recording medium 202 is, for example, a recording device such as a nonvolatile memory or HDD etc., which is capable of permanently holding data. The recording medium 202 stores information such as parameters etc. required for the operation of each block of the user terminal 200 and a program for a browsing application etc. in addition to the operation program of each block thereof. A use memory 203 is a recording device such as a volatile memory etc., which is used for temporarily storing data. The memory 203 is used as not only a developing area for the operation program of each block but also a storage area for temporarily storing data etc. outputted in the operation of each block.

A camera 204 is an imaging device unit having an imaging element such as a CCD, a CMOS sensor and the like. The camera 204 is used for acquiring information of a set of actual items for the game, which are placed by the player who uses the user terminal 200 at time of game play of the match game using the outside service. Although details thereof are omitted, during a period when the game play of the match game is performed, the camera 204 is intermittently operated to take an image at a predetermined timing and the obtained image is outputted in order.

A microphone 205 is a unit which converts detected audio into an electric signal. At time of game play of the match game for which the outside service is used, the microphone is used to acquire a declaration made by the player who uses the user terminal 200 at time of an operation to the actual items for the game. The microphone 205 intermittently detects audio at predetermined timing during a period when the game play of the match game is performed, and performs an operation so that an audio signal obtained by converting the detected audio in order is outputted while the audio is detected.

A presentation control unit 206 administers a control for providing the user of the user terminal 200 with various pieces of information. In the present embodiment, the user terminal 200 is equipped with a display 210 for displaying a screen (game display screen, other OS menu screen etc.) and a speaker 220 for outputting audio, as means for presenting various pieces of information to the user. However, the information presentation unit is not limited thereto and substitution therefor or addition thereto is possible. The display 210, which is provided in the user terminal 200, is a display device, which is for example, an LCD etc., wherein contents to be displayed thereon is controlled by the presentation control unit 206. In the present embodiment, the display 210 may be built in the user terminal 200, but it may be a display apparatus detachably connected to the user termina 200 from the outside thereof.

An operation input unit 207 is an interface such as a touch panel, button and the like, and the user terminal 200 is equipped with the operation input unit 207 as an interface. When the operation input unit 207 detects an input operation performed by the user, a control signal corresponding to the input operation is outputted to the use control unit 201.

A use communication unit 208 is a communication interface for communicating with other devices and is provided in the user terminal 200. The use communication unit 208 performs transmission and reception of data by connecting to the outside devices through the network 300 in a predetermined communication method regardless of wire or wireless.

<Summary of Match-making Service> The match-making service provided by the match-making system having the above-described configuration will be summarized below.

The match-making service according to the present embodiment will be provided to the user through a browsing application (hereinafter referred to as a browser) which is executed on a user terminal 200. That is, the user causes the user terminal 200 to gain access to a site created for the match-making service (hereinafter referred to as a provision site) by using the browser, thereby receiving provision of the match-making service through a screen of the browser shown on the display 210. More specifically, when the user performs user registration on the provision site, and follows a service login procedure, outside service information becomes available. Here, the user registration procedure includes an input of a profile which includes a nickname used in the match-making service and which will be open to other users (text input, or selection of an appropriate item from items set in advance regarding the profile). The server 100 makes transition to a state where communication connection with the user terminal 200 is maintained after the log-in, and the server 100 transmits information required for display on the user terminal 200, performs a control in response to an operation performed to the user terminal 200, and performs processing such as updates of various pieces of information.

Figure 4:
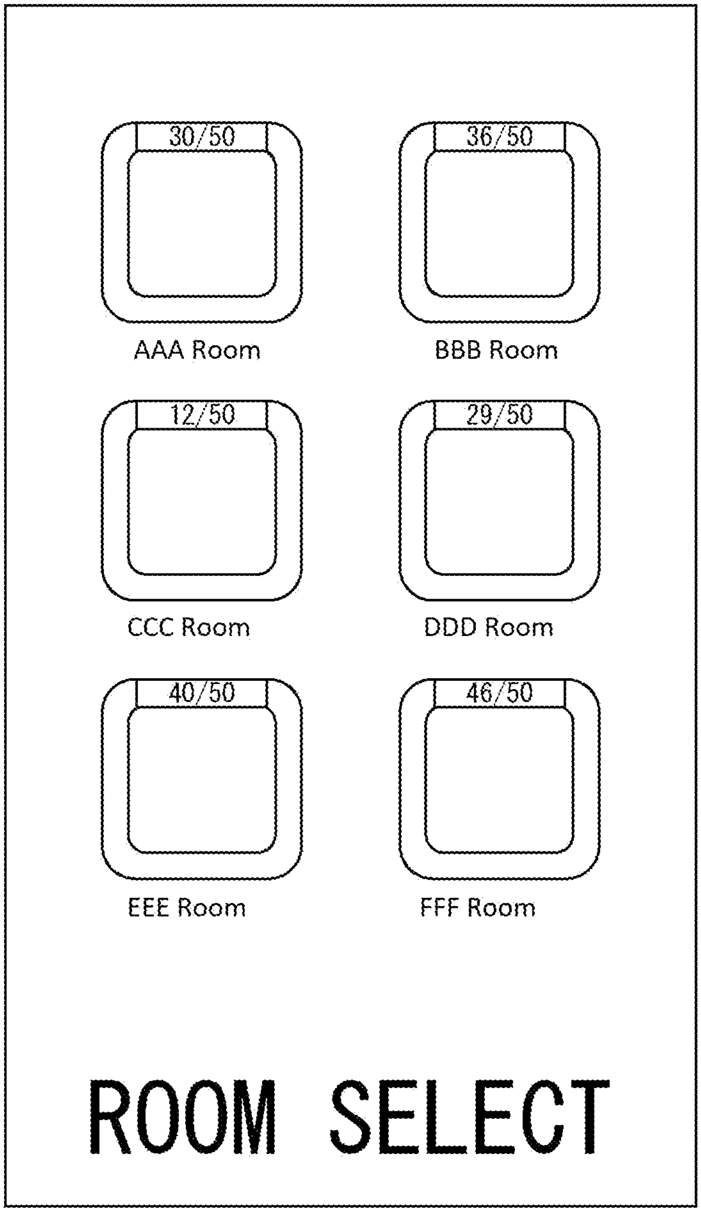
FIG. 4 is a diagram showing an example of a user interface displayed for a selection of a room, in a match-making service according to the embodiments of the present invention and the modified example.

<Determination of Room> After the user (hereinafter referred to as a use starter) completes the procedure regarding log-in of the service, a room, to which a user avatar associated with the use starter is arranged, is determined. The room is determined when the user selects a desired game title for match-making (or watching a game) and selects a room, which the user uses (enters), from among a plurality of rooms set for the selected game title. For the selection of the former, the use starter selects one from a list of a plurality of games titles displayed on the browser where a game play can be performed by using an outside service registered in the correspondent service DB 105. For the selection of the latter, for example, as shown in FIG. 4, a list of a plurality of rooms prepared for the selected game title is displayed on the browser, and the use starter selects one from the list.

As described above, since there is the upper limit of the number of avatars which can be arranged in one room (the number of users who can use the match-making service through such a room, that is, the number of entrants therein), upon the selection of the latter, the control unit 101 determines whether or not the use starter can enter the room, and performs control so that only when the use starter can enter the room, the user avatar associated with the use starter is arranged in the room.

In In addition, to make it easy for the use starter to select the room, a notice capable of determining whether or not the upper limit is reached, may be added to each of the plurality of rooms shown thereon when the latter is selected. For example, the notice may be shown as “the number of entrants/the upper limit” or an entrant rate (percentage) may be displayed in text or an image showing the entrant rate may be displayed. Or rooms where the upper limit is reached may be displayed so as to be unselectable. Or information to be sent to the user terminal 200 may be controlled so that the rooms, where no one can enter, are not displayed on the browser, thereby improving the convenience of the selection of the room by the use starter.

Figure 5A:
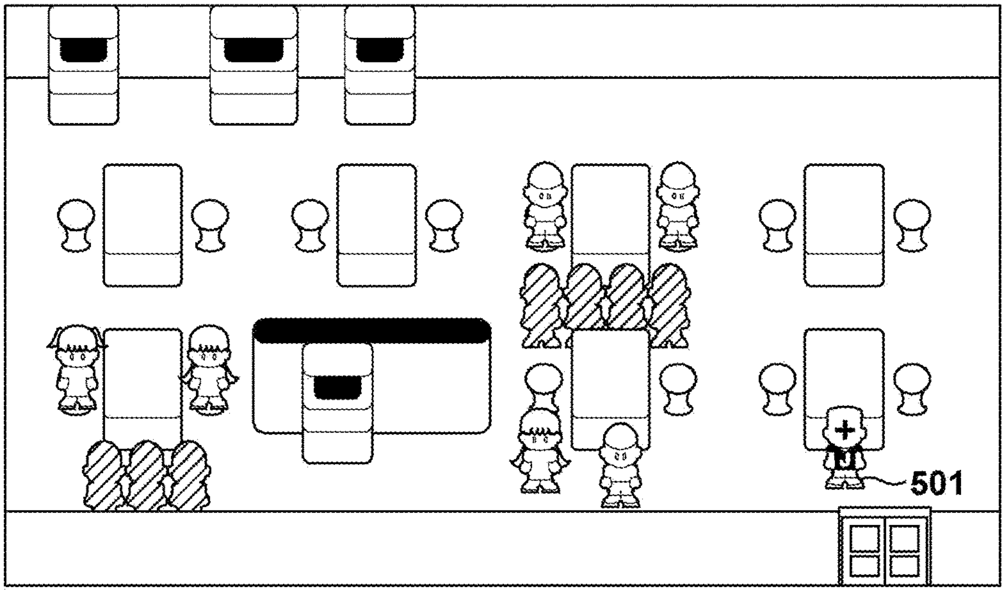
FIGS. 5A and 5B illustrates a display of a room presented when using the match-making service according to the embodiments of the present invention and the modified embodiment.

When a room is determined, the user avatar associated with the use starter is arranged in the determined room, and a field relating to the room (a field where avatars can move) is displayed on the user terminal 200 as shown in FIG. 5A. More specifically, the control unit 101 adds avatar arrangement information 1423 relating to the user starter, to state management information relating to the determined room, thereby making it possible to confirm the room in a state where the user avatar of the use starter is arranged, on the user terminal 200 of the use starter and those of the other users who use the same room.

Figure 5B:
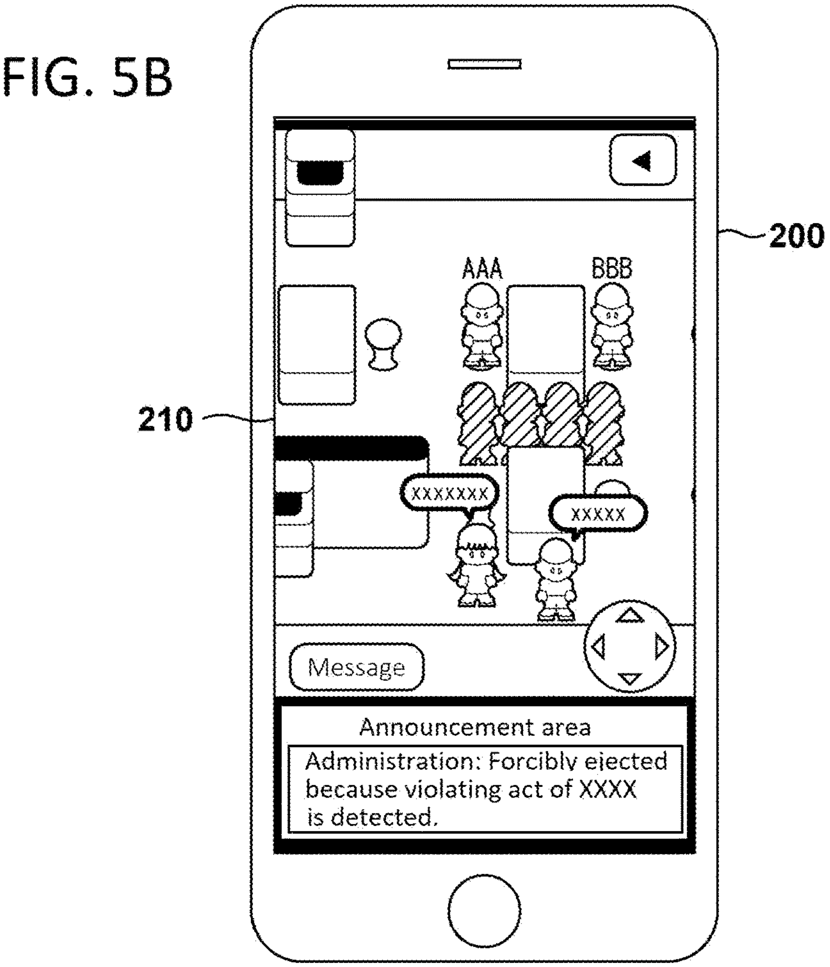

In order to enhance the attractiveness of the match-making service, unlike the display shown in FIG. 5A where the entire area is displayed, a display control may be performed so that the entire room is not displayed on the browser of each user terminal 200, that is, only a partial area of the room is displayed as shown in FIG. 5B. As shown in the figure, the area of the room to be displayed, may be determined depending on the position of the user avatar in the room, corresponding to each user terminal 200 (for example, the position of the avatar is used as a center). Such display control may be realized by differentiating the structure of the information for display sent to each user terminal 200 from the server 100. Or such display control may be realized by differentiating the content of the display by the presentation control unit 206 depending on the user terminal 200.

<Arranged Avatars> Next, types of avatars will be explained in detail, getting onto actions which can be performed in a room in which some execution authority is assigned to the avatars. As described above, according to the present embodiment, two types of avatars, that is, a user avatar, which is a first type avatar and an administration avatar, which is a second type avatar, are arranged in each room. The user avatar and the administration avatar are displayed in distinguishable form when the room is displayed on the browser.

(User Avatar) The user avatar is associated with the user of the user terminal 200 which is currently connected to the server 100. The position of the user avatar is changeable (movable) in the room in response to a movement operation performed to the user terminal 200 of the user associated therewith. The appearance of the user avatar is determined when the user logs in the service for the first time after user registration, and is registered in the user information, and after that, the appearance thereof is reproduced referring to the user information when the user avatar is arranged in the room in use of the service.

Here, the appearance of the user avatar is constituted by a combination of elements such as a face, a contour, a hairstyle, a body shape, cloth and the like, and the user can create desired appearance of the avatar by selecting one from a plurality of pieces prepared for each element. In other words, the number of kinds of appearance can be selected as appearance of the user avatar is determined according to the number of parts set for each element, so that one of the predetermined kinds of appearance is assigned to the user avatar. In addition, in order to simplify a setting performed by the user regarding the appearance, a lottery may be performed by the control unit 101, so that an appearance formed by a combination of randomly selected parts may be presented as a candidate to the user. In this case, when the user likes the appearance candidate, the candidate combination for the appearance of the user avatar to be used, can be determined by performing an operation regarding determination thereof. In addition, it may be configured that if the lottery processing for the candidate of the appearance may be performed two or more times, and two or more candidates obtained by the lottery processing performed two or more times are kept, the user may select a preferred appearance from them. An editing function capable of changing at least a part of elements of the appearance candidate may be provided to the user, so that the user can determine the final appearance of the user avatar.

Not only the execution authority for a moving action in the room, but also execution authority for transmission of a message and execution authority for an action related to an establishment of match-making is given to the user avatar. That is, regarding the user avatar associated with the user himself or herself and arranged in the room, various sorts of operations can be performed to the user terminal 200. That is, the various sorts of operations include an operation for inputting a message to be sent to a specific user or all the user in the room, and operations related to establishment of match-making, that is, an operation for causing the user avatar to make transition to a state where a game match with other user(s) is accepted, an operation for offering the game match to the other user(s), and/or an operation for accepting the offer from the other user(s), in addition to the movement operation of the avatar in the room. Since, in the match-making service according to the present embodiment, it is an object to specifically establish a match game, which is played among two or more people and which is provided by the outside service, the avatars subject to the match-making are limited to the user avatar arranged in the room.

Described herein are the action related to establishment of match-making for which the execution authority thereof is given to the user avatar, and match-making processing which is performed in the server 100 together with the action related to establishment of match-making In the description below, in order to easily understand the invention, exemplified is case where a match game provided for game play in an outside service corresponding to a room is realized by two players (one-on-one), and two users are matched as the players by the match-making processing.

Figure 6A:
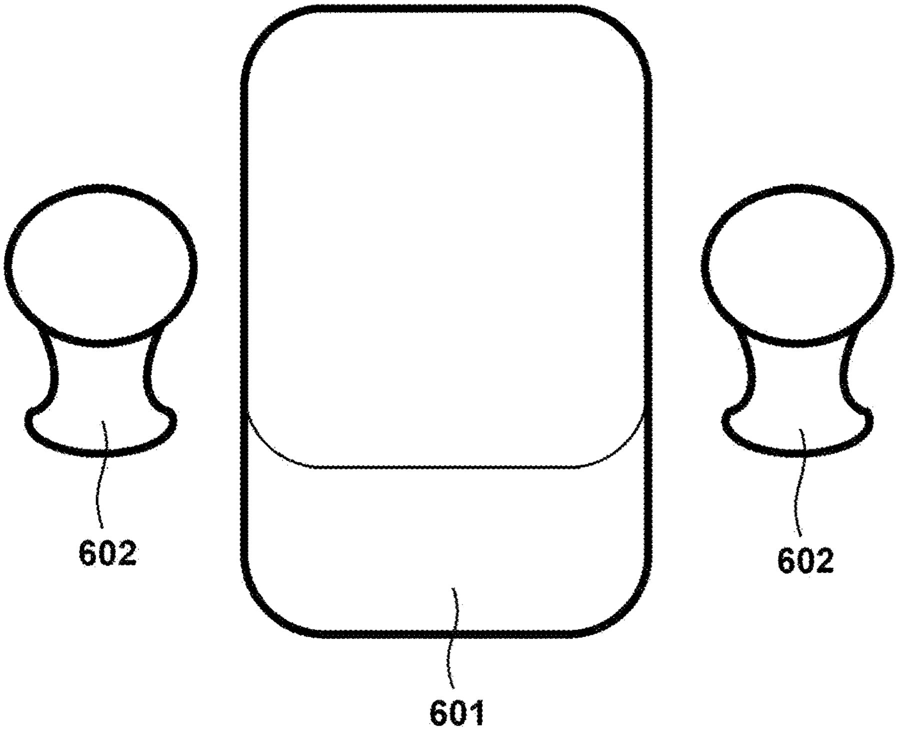
FIGS. 6A and 6B illustrates a status of each user avatar which is subject to match-making in the match-making service according to the embodiments of the present invention of the modified example.

In the match-making service according to the present embodiment, the match-making processing related to the match game is started when at least one user avatar is arranged at a predetermined position at the periphery of a table placed in a room. As shown in FIG. 6A, two chairs 602 are placed around the table 601, and as a trigger, when a user avatar is arranged at position of the chair 602 as a result of a moving operation, a state of the user avatar is managed as an object of the match-making.

Figure 6B:
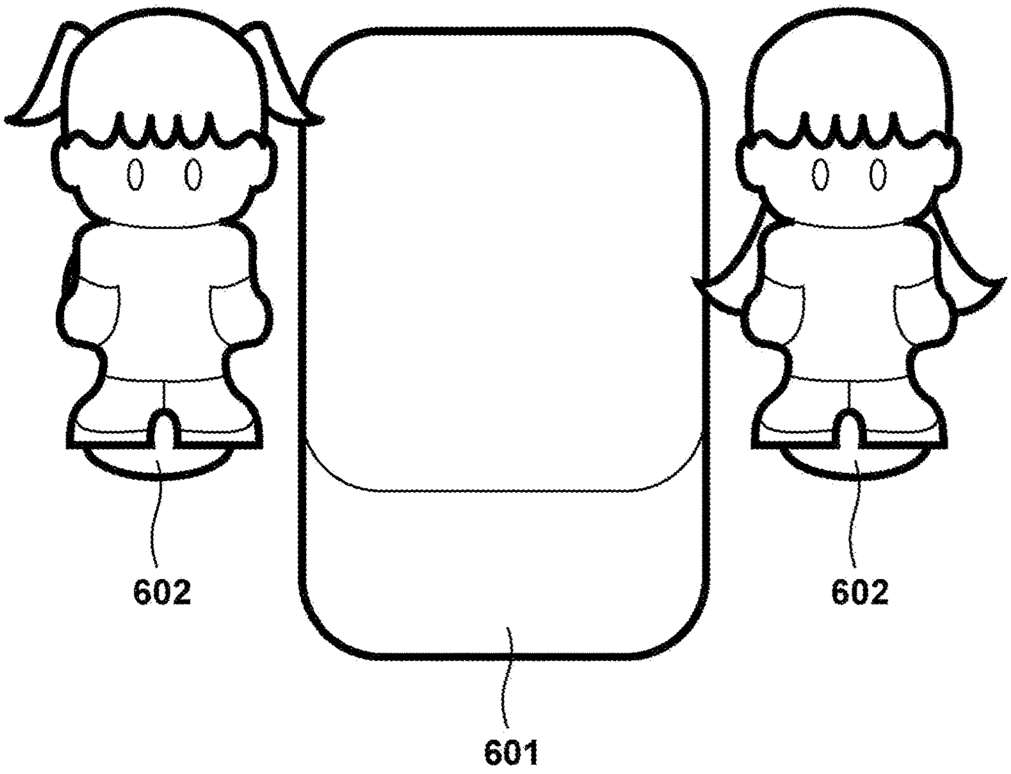

When a user avatar (hereinafter referred to as a stand-by avatar) subject to match-making is arranged around a table, and as shown in FIG. 6B, another user places his or her avatar to be used (hereinafter referred to as an offering avatar) at a position of the other chair 602 around the table, an offer for a match can be made to the user of the stand-by avatar. That is, in a first aspect of the present invention, as shown in the figure, the offer for a game match becomes available when the stand-by avatar exists at the periphery of the table, and the offering avatar and the stand-by avatar are arranged at the positions where they face each other across the table. Like the stand-by avatar, a state of the offering avatar is managed as an object of the match-making when the offering avatar is arranged at the position of the chair 602 where the stand-by avatar is not arranged, as a result of the movement operation.

Figure 7A:
FIGS. 7A and 7B show an example of a user interface displayed about intent confirmation between users who play the match in the match-making service according to the embodiments of the present invention and the modified example.
Figure 7B:
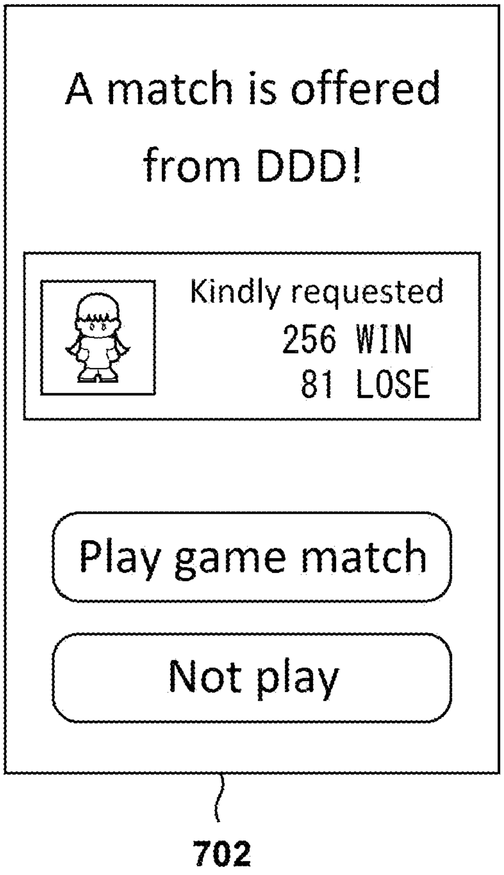

When the state of the offering avatar becomes subject to the match-making, a notice 701 is displayed on the user terminal 200 of the user associated with the offering avatar, as shown in FIG. 7A. The notice 701 includes a profile and match results of the user associated with the stand-by avatar, and confirmation of intent as to whether or not a match is offered to the user associated with the stand-by avatar. After that, when the user associated with the offering avatar, performs a selection operation to the item to the effect that the match shown in the notice 701 is offered, a notice 702 shown in FIG. 7B is displayed on the user terminal 200 of the user associated with the stand-by avatar, wherein the notice 702 includes a profile and match results of the user associated with the offering avatar and confirmation of intent as to whether or not the offer for the match is accepted. When the user associated with the stand-by avatar performs a selection operation to the item to the effect that the match in the notice 702 is accepted, it is regarded that an agreement regarding game play between the user associated with the stand-by avatar and the user associated with the offering avatar is made, whereby these users are matched as players of the match game (the match-making is established).

After the match-making is established, the players are registered in the outside service based on the user information of the two users between which the match-making is made (match-made users), the use of the outside service by the match-made users starts. More specifically, the server 100 transmits a creation request of a connection destination of the match game together with information of the matched users, to the server of the outside service, whereby the new connection destination related to the match game is created in the outside service, and then information of the connection destination is sent back to the server 100. For example, the information of the connection destination is associated with information for specifying the table 601 of the room and stored in the memory 103. And, the sent back information regarding the connection destination is transmitted together with a transfer instruction to the user terminals 200 of the match-made users, and a transfer operation to the connection destination related to the outside service is performed on the browser of the user terminal 200 which receives it. In this way, it is possible to start the match game with the other match-made user in the match-making service even if the match-made users do not directly follow registration procedures etc. in the outside service by themselves.

In the present embodiment, the log-in state of the match-making service is maintained even during transition to the outside service (during a period when game play of the match game in the outside service is received), so that each of the matched users can easily return to the match-making service after the match between the matched users ends. More specifically, for example, when the user terminal 200 of the matched user receives the connection destination information related to the outside service, another tab (or another window) of the browser is opened and a connection to the connection destination is established, and the tab is mainly displayed (the tab is displayed as a tab to be mainly displayed or another window is displayed on a mostfront face), thereby temporally realizing a transition to the outside service from the match-making service. At this time, since the tab related to the match-making service is maintained during the transition, the matched users can confirm not only the state of the room related to the match-making service and but also the play screen of the match game related to the outside service in a parallel manner.

In the present invention, as an example of the transition to the outside service, exemplified is case where transmission of user information is required at time of a creation request for the connection destination of the match game. However, the implementation of the present invention is not limited thereto and it may be modified accordingly depending on the specification of the outside service. For example, it may be configured that information related to the match-made users is not required at time of the creation request but user information such as a name of player etc. may be provided to the outside service when the user terminal 200 is connected to the connection destination.

When the match-making is established, the states of the user avatars associated with the two matched users are changed from a state subject to match-making to a game playing state and are managed. Here, in a precise sense, for the game playing state, the match-made users are not required to be playing the match game, and it may be set on condition that the match-made users make a transition to the outside service.

Figure 8A:
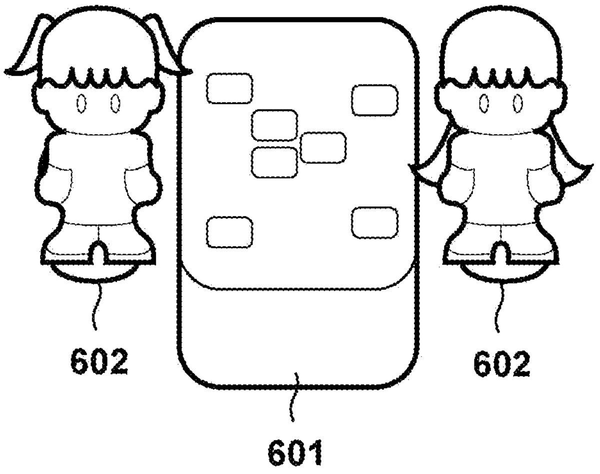
FIGS. 8A and 8B illustrate a display of a room presented when the match-making service according to the embodiment of the present invention and the modified example is used.

When the match-making is established and the user avatars respectively associated with the two matched users turn into a match playing state, a display is performed so that all the users in the room can understand the match-made users are playing the game match, that is, the match-made users are in transition to the outside service. In the present embodiment, when the user avatars, which are respectively arranged at two chairs 602 around one of the tables 601, go into the game match, the display is performed by adding, to the table 601, a performance indicating that the game match is currently played. The performance may be different depending on the outside service associated with the room. For example, when the match game provided for game play by the outside service is a TCG, as shown in FIG. 8A, an item(s) in form of a card(s) may be arranged on the table 601.

Regarding the one of the tables 601, a control is performed so that the user avatars (the stand-by avatar and the offering avatar) respectively arranged at positions of the chairs 602 cannot be moved during a period when the user avatars are subject to match-making processing or in a match playing state. More specifically, in case of the stand-by avatar, unless an operation for cancelling the standing-by is performed from time when the stand-by avatar is arranged at the position of the chair 602 until an offer for a match is made, even if another offer for the game match is made, the offer is declined during a period from time when the game match is offered, until the match-making is established. And unless an operation for cancelling the standing-by is performed and unless the match game ends in the outside service after the match-making is established, the stand-by avatar is controlled so as not be moved from the position of the chair 602 even an operation related to movement of the stand-by avatar is performed. In addition, in the case of the offering avatar, unless an operation for not making an offer is performed, unless the offer is declined from time when the offering avatar is arranged at the position of the chair 602, to time when the offer for the match is made, and unless the match game in the outside service ends after the match-making is established, the offering avatar is controlled so as not be moved from the position of the chair 602 even if an operation related to movement of the offering avatar is performed.

In addition, in the room, a control is performed so that entrance of other avatars to the positions of the user avatars which are in a non-movable state (the position of the chair 602) is excluded. In other words, the number of the user avatars for match-making processing with respect to the one of the tables 601 is limited to two. By this, it is possible to avoid processing, specifically related to intent confirmation for the match-making in the one of the tables 601, from being duplicately performed, and to reduce unconformity of display of the room among the users.

It is configured that watching of the match game related to the established match-making by other users (users who are not playing the game match, hereinafter referred to as match watching users) can be accepted. The watching of the game match is accepted by a notice including intent confirmation as to whether or not the user watches the currently executed match game. The notice is displayed in response to an operation performed to the user terminal 200 of the watching user, by selecting the table where the user avatars in a match playing state are arranged (a table to which a performance as to the currently played match is added). And on condition that an operation for selecting an item for watching the game match included in the notice is performed, watching of the match game related to the selected table, which is performed in the outside service, is determined.

When the watching thereof is determined, information of a connection destination, which is related to the match game performed with respect to the selected table, is transmitted together with a transfer command to the user terminal 200 of the watching user. A transfer operation to the connection destination related to the outside service is performed in the browser of the user terminal 200, which receives the information. For example, the information of the connection destination transferred to the user terminal 200 of the watching user may be the same as the information transmitted to the user terminal 200 of the match-made users as long as the outside service regards two users as players in the order of earlier connection in the same connection destination. Or in case where the outside service sets a connection destination for the players and a connection destination for the watching users which is different from that for the players, the information of the connection destination for the latter may be provided to the user terminal 200 of the watching users. By this configuration, even if the match-made users do not obtain the information of the connection destination related to the ongoing match game, he or she can make transition to the outside service as the watching users through the room and easily watch the ongoing match game.

Like the time of the ongoing match, at the time of watching the match, the log-in state of the match-making service is maintained even during a transition to the outside service (during a period when the match game performed in the outside service is watched), so that after the match-made users finish the game match or after the watching users end watching the game match, they can easily return to the match-making service. More specifically, for example, when the user terminal 200 of the watching users receive the connection destination information related to the outside service, another tab of the browser is opened and a connection to the connection destination is established, so that the tab is mainly displayed therefor, thereby temporally realizing a transition to the outside service from the match-making service. At this time, since the tab related to the match-making service is maintained during the transition, the watching users can confirm not only the state of the room related to the match-making service and but also a screen for watching the match game related to the outside service, in a parallel manner.

When the watching of the match is determined, the state of the user avatar associated with the watching user is managed as watching a match. Here, in a precise sense, similarly to the match playing state, the match watching state does not require, as a condition, that the game play is started and the match game is watched, and it may be set on condition that the watching user makes transition to the outside service.

Figure 8B:
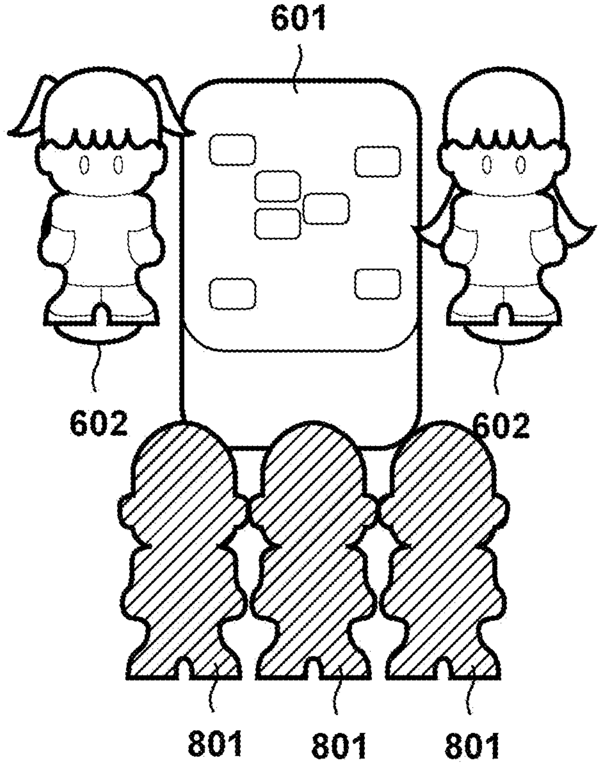

In addition, when the state of the user avatar associated with the watching user turns into a match watching state, a display is performed so that a display form of the user avatar in the room is changed into the game watching state as a second aspect of the present invention, whereby all the users in the room can understand it. Here, the display form of the user avatar in the match watching state is shown in FIG. 8B, in which the user avatars are arranged adjacent to the table 601 (801) for watching the game match so that a third party can understand which table is being watched. In addition, when the watching users are connected to the outside service and are watching the game match, as described above, since it is assumed that the tab related to the outside service is mainly checked, it is preferred to configure so that contact from the other user avatars cannot be made. Therefore, in an example shown in FIG. 8B, the user avatars, which is in the match watching state, do not have appearance assigned to the user avatar, that is, a form thereof is changed to, for example, a mono-color etc., so that what types of user avatars they are cannot be identified, and it is configured that an operation for checking a profile of the user avatar or an operation for using a communication function appointing the user avatar cannot be performed.

In addition, when the number of watching users who are watching a match game related to the one of the table 601 is large, it may be sometimes difficult to arrange user avatars in the match watching state as many as the number of watching users around the one of the tables 601. Therefore, the number of user avatars in the match watching state which are arranged therearound, does not have to agree with the number of the watching users. Preferably, the number of user avatars in the match watching state, which are arranged therearound, may be proportional to the number of the watching users.

In the present embodiment, the watching of the game match can be accepted by performing an operation of selecting the one of the tables 601 around which the user avatars in the match watching state are arranged. However, the practice of the present invention is not limited thereto. The watching of the game match may be accepted in response to an operation of selecting a user avatar, which is in the match playing state (a user avatar associated with the match-made user).

When the match game between the match-made users who have made transition to the outside service ends, the use of the outside service ends and the match-made users return to the match-making service. It is grasped that use of the outside service ends, based on information thereabout, which may be provided to the server 100 from the user terminal 200 of at least one of the match-made users, or based on the information thereabout, which may be directly provided to the server 100 from the outside service. In description of the match-making system according to the present embodiment, when the match game performed in the outside service ends, the result of the match game is provided from the server of the outside service to the server 100, the end of use of the outside service is recognized based on the reception of the result of the match game.

Figure 9A:
FIGS. 9A and 9B show an example of display of a result of a match game performed in the outside service in the match-making service according to the embodiments of the present invention and the modified example.
Figure 9B:

When the result of the match game performed between the match-made users is received thereby, processing for releasing the match playing state of the user avatars associated with the match-made users and for making them movable in the room, is carried out. The match result information 1405 in the user information regarding the match-made users is updated based on the result, and a win-loss notice which corresponds to the result is sent to the user terminal 200 of each of the match-made users. The content of the win-loss notice to the winner shown in FIG. 9A may be different from that of the win-lose notice to the loser shown in FIG. 9B.

(Administration Avatar) On the other hand, an administration avatar is not assigned to an arbitrary user and is movably arranged in the room as an arrangement avatar on the administration side of the match-making system and as an object which realizes various functions regarding the services to be provided. In the match-making service provided through the match-making system according to the present embodiment, the arranged avatar arranged in the room performs at least a part of functions on the administration side of the match-making system such as elimination (ejection) etc. of the inappropriate users. That such a function is performed thereby is presented to each user through the display of the room.

In order to let the users know that the administration avatar is not associated with any of users, as shown as 501 in FIG. 5A, the appearance of the administration avatar is formed by parts which are not selected as the appearance of any user avatar so that the users can recognize it. In addition, at least an administration avatar is arranged in each room managed by the server 100.

In a communication system in which a conventional virtual space is used, when there is an improper user therein, for example, when such a user performs harassment to other user(s) or uses the service in a manner different from the original purpose, after the acts of such a user is reported by other user(s), a determination is made thereabout by the administration side based on the action log relating to that user after a while, and then processing in which the account of that user is suspended (ejected) is carried out. That is, even if there is such an improper user, it takes time to stop the use of such a user, so that a preferred use of users is prevented and the interest of the users drops, thereby leading to decrease of the number of the users.

On the other hand, the match-making system according to the present embodiment, is configured to perform processing so that some of inappropriate acts which can be mechanically determined to be right or wrong are detected as a function of the administration avatar, and such a user is ejected from the room (kick the user avatar out of the room), and the other users in the room is notified of it. In the match-making system according to the present embodiment, the action of the administration avatar in the room is controlled by the action control unit 108. The action control unit 108 performs processing for ejection (ejection processing), in which a user who commits an act meeting a detection rule for ejection is detected, and the user avatar associated with such a user is kicked out of the room.

Actions subject to ejection may include, for example, transmission of a message including a specific word(s) to other users or the entire room (which can make others feel bad, such as defamation) and an act in which it is neglected although the user logs in. Here, the action control unit 108 detects the former act by judging whether or not a predetermined forbidden word(s) is included in text of a message transmitted from such a user. The action control unit 108 detects the latter act by judging whether a predetermined time elapses in a state where the user avatar is arranged in the room but the outside service is not used, and in a state where no movement is made or a monotone movement is repeated. In addition, the action control unit 108 may judge whether or not the act is subject to ejection, in proportion to the number of reports from other users totaled for each of such users.

Figure 10A:
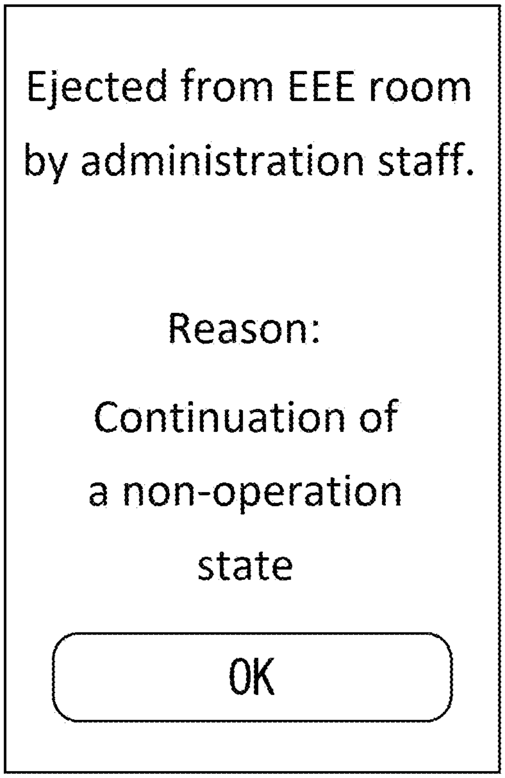
FIGS. 10A and 10B show an example of display attributing to an action of an administration avatar in the match-making service according to the embodiments of the present invention and the modified example.

When the action control unit 108 detects a user who commits an act, which is subject to ejection, the ejection processing therefor is performed and the user avatar is ejected from the room wherein the state management information corresponding thereto is deleted so that the user avatar is not arranged in the room, and the display of the room in the browser is stopped. At this time, required information is provided to the user terminal 200 of the user, which is subject to the ejection, from the server, in order to display a notice indicating things to the effect of ejection and the reason therefor, as shown in FIG. 10A. The ejection processing includes a processing for displaying a notice that an ejection is performed, on the user terminal 200 of each of the other users related to the room, by using, for example, an announcement display provided in a lower part of the display shown FIG. 5B. Therefore, it is possible to suppress an inappropriate use and let the users know that management of the room by the administration side is functioning.

The action control unit 108 performs action control so that the administration avatar moves in the room while the match-making service is provided. This control is performed so that the administration avatar may not be regarded as a mere NPC arranged in a room (to create awareness of an operation which is performed by the administrator of the administration side). The administration avatar may move irregularly within the entire room, which is set as a movable range thereof. In the case where the above-mentioned ejection processing is performed on condition that an act subject to ejection is detected two or more times, even when the number of times thereof does not satisfy the condition for the ejection processing, the administration avatar may be moved around such a user avatar (and additionally a warning may be given thereto). By moving the administration avatar in the room, it is possible to suppress inappropriate use.

In addition, since the administration avatar is provided for only a function for realizing a preferred service in each room in the match-making system, execution authority related to an action to establish match-making for play of match game with other user(s) is not granted to the administration avatar, so that a control is performed so as not to become an object of the match-making That is, any user is controlled so that he or she cannot offer a game match to the administration avatar.

Furthermore, execution authority of an action for guiding a user to game play of a match game is given to the administration avatar.

Figure 10B:
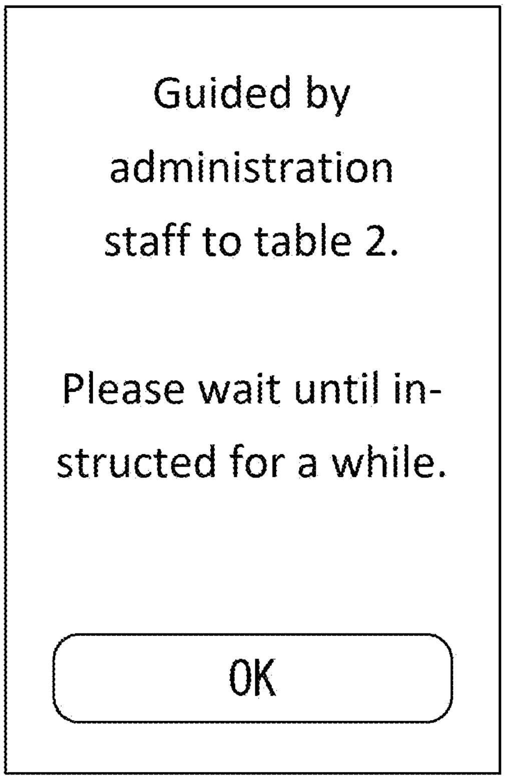

In a configuration where match-making is performed on condition that a user voluntarily put a user avatar into a specific state, when, for example, users just start to play the game and are unfamiliar with the game play, some of them may hesitate about an act itself for satisfying the condition of match-making For this reason, a user avatar associated with a user who is inferred that he or she hesitates about game play of a match game, is identified as an object to be guided. And as shown in FIG. 10B, the action control unit 108 provides, as a guidance from the administration avatar, a notification to the effect that the user is invited to a match game, to the user terminal 200 of such a user. For example, such a user avatar which is an object to be guided, may be a user avatar which moves in the room within a predetermined period, but does not send a message with the content responding to a massage directly sent from other user avatars (a message sent to only some users but not to all the users), or a user avatar about which the number of play times of match games is below a threshold value and the number of times of browsing of profiles related to other users within a predetermined period is above a threshold value.

And the action control unit 108 makes the user avatar, which is an object of guidance, move to a position of a chair 602 where any avatar is not arrange, thereby making a transition to a state of an object for match-making. At this time, it is possible to perform processing in which the action control unit 108 determines another user for match-making with the user associated with the user avatar which is the object of guidance, referring to, for example, information of game match history and game match rate etc., and move it to a position of the chair 602 for an opponent so that a match game may be easily played.

Figure 11:
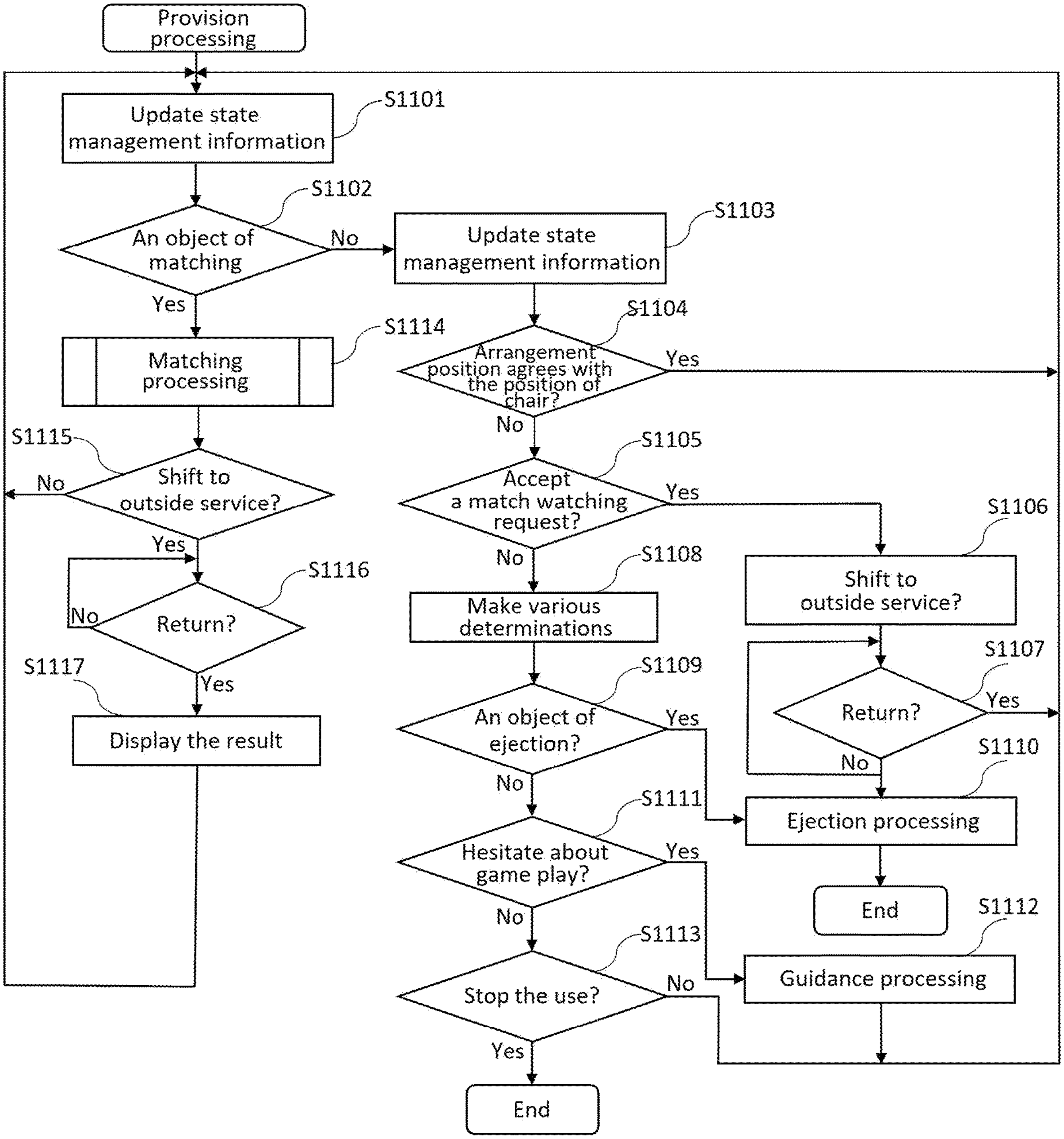
FIG. 11 is a flowchart of an example of provision processing performed in a server 100 according to according to the embodiments of the present invention and the modified example.

<<Provision Processing>> A provision processing for providing a match-making service to a user of one of user terminals 200 in the server 100 having the above-described configuration according to the present embodiment, will be specifically described, referring to a flow chart shown in FIG. 11. The processing corresponding to the flowchart can be realized by the control unit 101 which reads out a corresponding processing program stored in, for example, the recording medium 102, and expands it in the memory 103 and executes it.

In addition, in order to facilitate understanding of the provision processing described below, a user who is an object of the provision processing is referred to as "an object user", a user terminal 200 used by the object user is referred to as "an object terminal", a user avatar associated with the object user is referred to as "an object avatar" and a room used for the service by the object user is referred to as "an object room."

For example, the present provision processing is started in response to operations for connecting the object terminal to the server 100, performing service log-in processing related to the object user, and selecting one room (object room). At this time, avatar arrangement information 1423 related to the object avatar is configured, and is added to the state management information of the corresponding room. The present provision processing is repeatedly performed until a predetermined termination condition is satisfied, and information for display is configured based on the state management information of the object room and sent out to the object terminal, each time. And an area determined based on the object avatar within the object room is presented to the object user through the browser displayed on the object terminal.

In S1101, the control unit 101 updates state management information related to the object room based on an operation performed about the other user avatar in the object room (change in an arrangement position and state changes related to various flags).

In S1102, the control unit 101 determines whether or not the object avatar is in a state of an object of match-making The determination in this step is performed according to an object flag 1434 included in the avatar arrangement information 142. When the control unit 101 determines that the object avatar is in the state of an object for the match-making, the processing is transferred to S1114. When the control unit 101 determines that the object avatar is not in the state of an object of the match-making, the processing is transferred to S1103.

In S1103, if an operation related to the change in the arrangement position of the object avatar is performed, the control unit 101 updates the state management information related to the object room based on the content of the operation. More specifically, the control unit 101 updates the arrangement position 1433 included in the avatar arrangement information 1423 of the object avatar, based on the content of the movement operation.

In S1104, the control unit 101 determines whether or not the arrangement position of the object avatar agrees with the position of the chair 602 arranged in the object room. When the control unit 101 determines that the arrangement position of the object avatar agrees with the position of the chair 602, the object flag 1434 included in the avatar arrangement information 1423 of the object avatar is changed into TRUE, thereby setting it into a state of an object for the match-making, and the processing returns to S1101. In addition, when the control unit 101 determines that the arrangement position of the object avatar does not agree with the position of the chair 602, the processing is transferred to S1105.

In S1105, the control unit 101 determines whether or not an operation related to a match watching request for a match game is performed, with respect to the table 601 where the match-made user avatars are arranged. More specifically, the control unit 101 determines whether or not the object user performs an operation related to the match watching request of the match game, to a table where two user avatars are respectively arranged at positions of chairs 602, and both of match playing flags 1435 of the two user avatars are TRUE, among tables 601 arranged in the object room. When the control unit 101 determines that the operation related to the match watching request of the match game is performed, the processing is transferred to S1106, and when the control unit 101 determines that it is not performed, the processing is transferred to S1108.

In 1106, the control unit 101 performs various kinds of processing for transferring the object user, as a match watching user, to the outside service related to the object room. More specifically, the control unit 101 performs a control so as to change the match watching flag 1436 included in the avatar arrangement information 1423 of the object avatar, into TRUE, and to invalidate an operation related to a change in arrangement position to the object avatar. In addition, the control unit 101 transmits the stored connection destination information about the table 601 for which the match watching request is made, together with a transfer command, to the object terminal.

In order to facilitate understanding of the provision processing according to the present embodiment, explanation thereof will be given below, exemplifying case where a display of a browser (tab) related to the match-making service on the object terminal is maintained in a state which is the same as the state just before the transition to the outside service, and display control of the other user avatars and the table 601 is not performed during the transition to the outside service. That is, in the case of this step, the tab of the object terminal is maintained, so as to display a state of the object room at time when the object avatar is arranged in a match watching state. However, the practice of the present invention is not limited thereto, and the display control may be performed according to change in the state management information which occurs in the object room during the transition to the outside service.

In S1107, the control unit 101 determines whether or not the object user returns from the outside service. The determination at this step may be made based on whether or not the information of the result of the match game executed with respect to the table 601 is received. When the control unit 101 determines that the object user returns from the outside service, it changes the match watching flag 1436 included in the avatar arrangement information 1423 of the object avatar to FALSE, thereby setting it so as to be movable, and the processing returns to S1101. In addition, when the control unit determines that the object user does not return from the outside service, this step is repeated.

On the other hand, when it is determined that any operation related to a match watching request of the match game in S1105 is not performed, the action control unit 108 makes various determinations related to the object user, based on the action history of the object avatar under control of the control unit 101 in S1108. The determination performed at this step, is made based on the determination whether or not the object user is an object of the ejection and an estimate that the object user in the estimation unit 107 hesitates about game play in the match game, which are described above.

In S1109, the control unit 101 determines whether or not the object user is subject to an ejection, based on the determination result in S1108. When the control unit 101 determines that the object user is an object of ejection, the processing is transferred to S1110, and when the control unit 101 determines that it is not, then the processing is transferred to S1111.

At 1110, the action control unit 108 executes ejection processing of the object user under the control of the control unit 108. The ejection processing includes deletion of avatar arrangement information related to the object avatar from the state management information, transmission of information for display related to a notice to the effect that the object user has been ejected from the object room, and a notice to the entire room that the ejection is performed. As described above, the notice related to the ejection processing is performed as an action of the administration avatar. After the ejection processing by the action control unit 108 is completed, the control unit 101 completes the present provision processing, and can forcibly terminate the object user's use of the service related to the object room.

On the other hand, when it is determined that the object user is not subject to an ejection in S1109, the control unit 101 determines, in 5111, whether or not it is inferred that the object user hesitates about game play of the match game, based on the determination result at A1108. When the control unit 101 estimates that the object user hesitates about game play of the match game, the processing is transferred to S1112, and when it does not estimate as such, the processing is transferred to S1113.

The action control unit 108 performs processing for guiding the object user to the game play of the match game under control of the control unit at 1112. The guiding processing includes: processing for transmitting, to the match terminal, display information related to a notice to the effect of invitation to the match game; processing for changing the arrangement position 1433 included in the avatar arrangement information 1423 related to the object avatar, to the position of any one of the chairs 602 in the object room; and processing for changing the object flag 1434 to TRUE thereby making the object avatar subject to the match-making The control unit 101 returns the processing to S1101 when the guiding processing ends.

In addition, in S1113, the control unit 101 determines whether or not to stop providing the service to the object user with respect to the object room. The determination at this step, is performed based on whether processing related to an exit from the object room is performed in the object terminal, that is, whether or not an exit request is received from the object terminal. When the control unit 101 determines that the provision of the service related to the object room ends, the present provision processing is completed. When the control unit 101 determines that it does not, the processing returns to S1101.

On the other hand, it is determined that the object avatar is in a state where it is an object for match-making in S1102, the control unit 101 performs the match-making processing in S1114.

Figure 12:
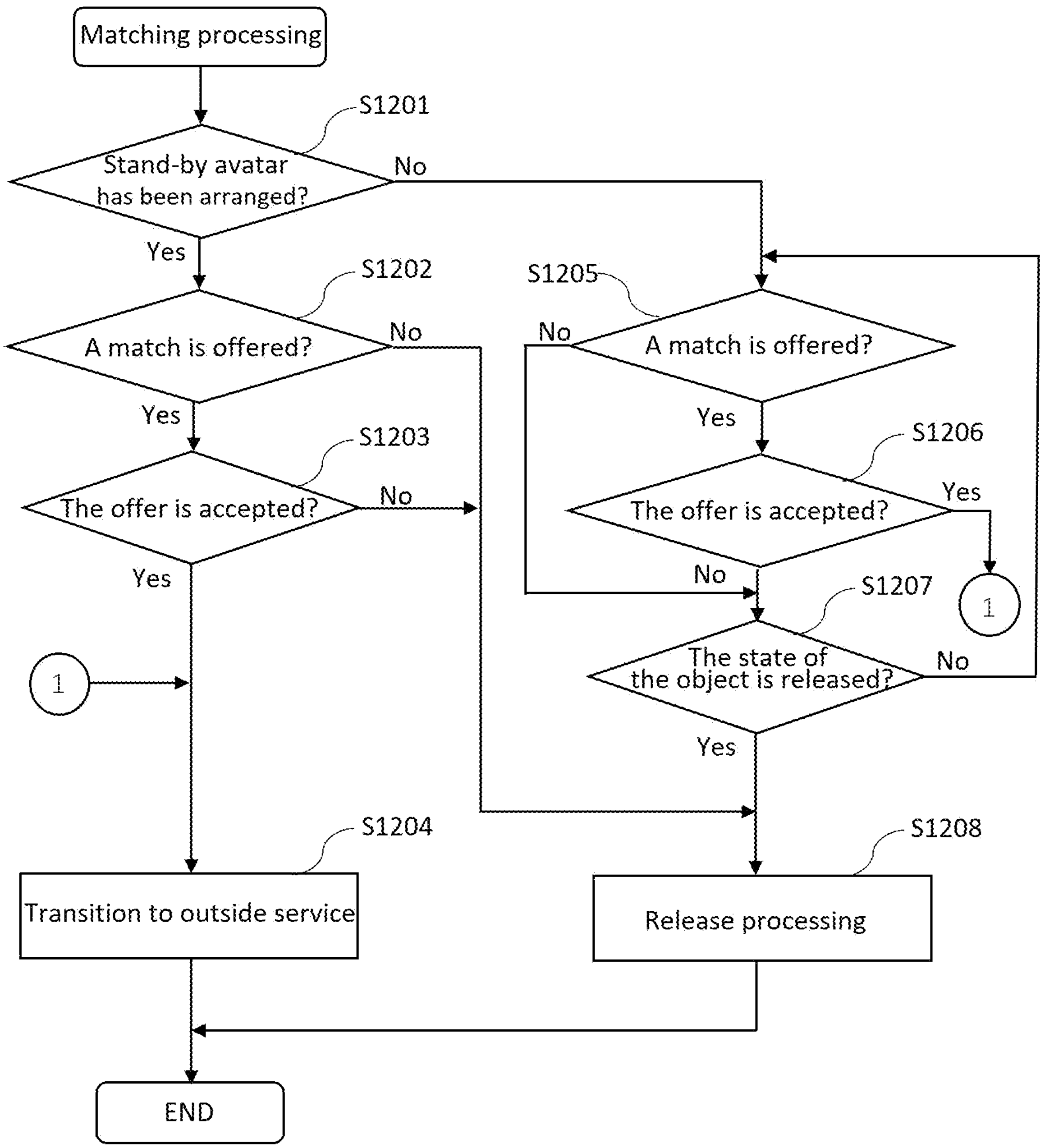
FIG. 12 is a flowchart of an example of match-making processing performed in the server 100 according to the embodiments of the present invention and the modified example.

<Match-making Processing> The match-making processing performed at this step, will be described below in detail, referring to FIG. 12.

In S1201, the control unit 101 determines whether or not another user avatar (stand-by avatar) has been arranged at the position of the other chair 602 around the table 601, which corresponds to the arrangement position of the object avatar. That is, the control unit 101 determines whether or not the object avatar is an offering avatar. When the control unit 101 determines that the stand-by avatar has been arranged thereat, the processing is transferred to S1202. When the control unit 101 does not determine as such, the processing is transferred to S1205.

In S1202, the control unit 101 determines whether or not a game match is offered to the stand-by avatar. Specifically, the control unit 101 transmits display information formed based on the profile information 1404 and match result information 1405 related to the user associated with the stand-by avatar, thereby causing the object terminal to display a notice of intent confirmation as to whether or not the match is offered to the user associated with the stand-by avatar. The control unit 101 performs a determination at this step based on information of an operation performed to the notice. When the control unit 101 determines that the game match is offered to the user associated with the stand-by user, the processing is transferred to S1203. When the control unit 101 determines that it is not offered, the processing is transferred to S1208.

In S1203, the control unit 101 determines whether or not the offer for the game match is accepted by the user of the stand-by avatar. Specifically, the control unit 101 transmits display information formed based on the profile information 1404 and match result information 1405 related to the object user, to the user terminal 200 related to the stand-by avatar, thereby causing the user terminal 200 to display a notice of intent confirmation as to whether or not the offer for the match from the object user is accepted. And the control unit 101 makes determination at this step based on the information of an operation performed to the notice. When the control unit 101 determines that the user associated with the stand-by avatar accepts the offer for the game match, the control unit 101 regards it as establishment of machi-making, so that the processing is transferred to S1204. When the control unit 101 determines that the user does not accept it, the processing is transferred to S1208.

In S1204, the match-making unit 109 completes the match-making processing by performing processing for match-made two users (one of them is an object user) under the control of the control unit 101 and transferring the to the outside service. Specifically, regarding the avatar arrangement information 1423 of the user avatars (one of the is an object avatar) corresponding to the match-made two matched users, the match-making unit 109 changes an object flag 1434 into FALSE, and a match flag 1435 into TRUE. In addition, the match-making unit 109 forms information related to player registration based on the user information associated with the match-made users, and transmits it together with a creation request for the connection destination to the outside service, and receives a connection destination information related to a new match game from the outside service. And the match-making unit 109 transmits the received connection destination information together with a transfer command to the user terminals 200 related to the matched users (one of them is an object terminal), thereby causing them to shift to the outside service. At this time, the match-making unit 109 associates the received connection destination information with information for identifying the table 601 which is an object of the match-making processing in the memory unit 103 and stores it in the memory unit 103.

On the other hand, in S1201, when it is determined that the stand-by avatar has not been arranged, that is, when a user avatar becomes a stand-by avatar, the control unit 101 determines whether or not a game match is offered to the user avatar, in S1205. In other words, at this step, the control unit 101 determines whether or not any one of the user avatars (an offering avatar) is arranged at a chair 602 located at a position opposite to that of the object avatar in the periphery of the table 601 around which the object avatar is arranged, and the user associated with the offering avatar makes the offer for the match to the object avatar. When the control unit 101 determines that the game match is offered to the object user, the processing is transferred to S1206. When the control unit 101 determines that an offer for the game match is not made, the processing is transferred to S1207.

In S1206, the control units 101 determines whether or not the offer for the match is accepted by the object user. Specifically, the control unit 101 causes the object terminal to display a notice of intent confirmation as to whether the object user accepts the offer for the game match from the user of the offering avatar, by transmitting, to the object terminal, display information formed based on profile information 1404 and match result information 1405 related to the user of the offering avatar. And the control unit 101 makes determination at this step, based the information of an operation performed to the notice. When the control unit 101 determines that the object user accepts the offer for the match, the processing is transferred to S1204. When the control unit 101 determines that the offer is not accepted, then the processing is transferred to S1207.

In S1207, the control unit 101 determines whether or not to release the state of an object of the match-making with respect to the object avatar. The determination at this step, is made based on whether or not an operation for releasing the standing-by regarding the match-making is performed on the object terminal. When the control unit 101 determines that the state of the object of match-making is released, the processing is transferred to S1208. When the control unit 101 determines that the state is not canceled, the processing is transferred to S1205.

In S1208, the control unit 101 performs processing for releasing the state where the object avatar is an object of match-making, thereby completing the match-making processing. Specifically, the control unit changes the object flag 1434 included in the avatar arrangement information 1423 of the object avatar, into FALSE, thereby changing it into a state in which the object avatar is movable in the object room. At this time, the control unit 101 changes the arrangement position of the object avatar to a position different from that of the chair 602 where the object avatar had been arranged, so that other avatars can move to the position of that chair 602.

Thus, when the match-making processing ends, the control unit 101 determines whether or not the object user shifts to the outside service in the provision processing in 51115. Specifically, the control unit 101 makes the determination at this step based on the match playing flag 1435 related to the object avatar. When the control unit 101 determines that the object user switches to the outside service, the processing is transferred to S1116. When the control unit 101 determines that the object user does not make a transition to the outside service, the processing is transferred to S1101.

In S1116, the control unit 101 determines whether or not the object user returns from the outside service to the match-making service. The determination at this step may be made based on whether or not information of the result of the match game performed in the outside service is received. When the control unit 101 determines that the object user returns to the match-making service, the control unit 101 transfers the processing to S1117. When the control unit 101 determines that the object user does not return thereto (that is, during a transition), the processing at this step is repeated.

In S1117, the control unit 101 performs processing related to display of result of the match game. Specifically, the control unit 101 updates the match result information 1405 related to the object user based on the received information of the match game result. And the control unit 101 transmits display information related to the display of the result, based on the received match game result information, to the object terminal, thereby causing the object terminal to display the result. In addition, the control unit 101 changes the object flag 1434 related to the game match avatar into FALSE, and performs control so that it can move in the object room. When the control unit 101 completes the processing related to the result display, the processing returns to S1101.

By this configuration, in the match-making system according to the present embodiment, it is possible to realize preferred match-making about the outside service where a multiple player match is realized.

[Embodiment 2] In the Embodiment 1 described above, the action control unit 108 provided in the server 100 performs action control of the administration avatar. However, the practice of the present invention is not limited thereto. For example, in the configuration in which each room of the match-making service is managed by a manned operation, a user interface for the action control of the administration avatar may be provided to the administrator. That is, actions of the administration avatar may be controlled based on an operation performed to an information communication terminal (hereinafter referred to as an administrator terminal) of the administrator who is connected to the server 100, as in the case of the user avatars.

The administrator terminal may have the same functional structure as that of the user terminals 200 or a functional structure in which a camera 204 and a microphone 205 are removed from the functional structure of a user terminal 200. In response to the fact that he or she logs in the service as the administrator through a browser, the administration avatar is operated whereby part of execution authority of the administration side functions is given to it. More specifically, the information for display based on the state management information of the room is transmitted to the administrator terminal from the server 100, and the room for the game match is displayed through the browser which is displayed on the administrator terminal. The display of the administrator terminal may be different from that of the user terminals 200 in that all the areas of all the rooms may be presented without regard to the arrangement position of the administration avatar, in order for the administrator to easily grasp the situation.

Figure 13:
FIG. 13 is a diagram showing an example of a user interface displayed on an administrator terminal in the match-making service according to the embodiments of the present invention and the modified example.

As shown in FIG. 13, for example, for example, the user interface provided to the administrator may perform not only an operation for moving the administration avatar in the room, but also an operation for guiding the selected user avatar to game play of a match game and an operation for receiving an instruction of an ejection. The functions for making a suggestion to the user avatar based on the estimate result obtained by the estimation unit 107 and the determination result about inappropriate use, which is performed in the action management unit 108, may be included in the functions related to the user interface shown in FIG. 13, in order to assist the administrator's grasp of the situation.

Thus, by configuring the match-making system as described above, for example, it is possible to provide the administrator with an interface for administration with the flexible and smooth match-making service, for example, in an online match event etc., which takes place in a specified day determined in advance.

[Modified Example] In the embodiments described above, a user avatar is set as an object of match-making on condition that the user avatar is arranged in a specified position (the position of chair 602) in a room, and the match-making is performed after an agreement about game play is made between the users. However, the practice of the present invention is not limited thereto. For example, it may be configured that an offer for a game match can be made to a user avatar arranged in any position in the room, and when an agreement of match-making is made therebetween, user avatars of the match-made users may be arranged at positions of chairs 602 placed around the same table 601, and then they may shift to the outside service.

[Other Embodiment] The present invention is not limited to the above-described embodiments. Without departing from the spirit and scope of the present invention, various modifications and changes are possible within the scope of the gist of the present invention. In addition, the match-making system according to the present invention, may be realized by a program by which one or more computers are allowed to function as the respective devices of the match-making system. This program can be provided/delivered by recording it in a computer readable medium or via an electric telecommunication line.

REFERENCE NUMERALS

100: Server, 101: Control unit, 102: Recording medium, 103: Memory, 104: User DB, 105: Correspondent service DB, 106: State management DB, 107: Estimation unit, 108: Action control unit, 109: Match-making unit, 110: Communication unit, 200: User terminal, 201: Use control unit, 202: Use recording medium, 203: Use memory, 204: Camera, 205: Microphone, 206: Presentation control unit, 210: Display, 220: Speaker, 207: Operation input unit, 208: Use communication unit, 300: Network

The invention claimed is:

1. A match-making system for providing communication through avatars arranged in a virtual space and a service of match-making for a match game, comprising:

a first accepting unit which accepts a connection from an information communication terminal of a user of the service;

an assignment unit which assigns a first kind avatar, which is an object of the match-making for the match game, to the user of the information communication terminal, which is connected thereto;

a management unit which movably arranges, in the virtual space, the first kind avatar assigned to the user by the assignment unit and a second kind avatar, which is not subject to the match-making for the match game, and manages states thereof;

an action control unit which controls an action of the second kind avatar in the virtual space; and a display control unit which causes a display unit of the connected information communication terminal to display the virtual space, based on state information of the first kind avatar and the second kind avatar managed by the management unit, so that the first kind avatar and the second kind avatar are distinguishable, wherein execution authority of an action related to establishment of the match-making for the match game with another first kind avatar, is given to the first kind avatar, instead of not giving the execution authority of an action related to establishment of the match-making for the match game with the first kind avatar arranged in the virtual space, execution authority of an action for arbitrarily ejecting the first kind avatar from the virtual space, is given to the second kind avatar, and the management unit stops arranging the first kind avatar, which is subject to an ejection, in the virtual space when an action for the ejection is performed by the action control unit.

2. The match-making system according to claim 1, wherein the display control unit causes the display unit of the information communication terminal of the first kind avatar which is an object of the ejection, to display a notice about the ejection.

3. The match-making system according to either claim 1, wherein when the match-making for the match game is established among a predetermined number of the first kind avatars the management unit manages a state of the predetermined number of the first kind avatars, as a match playing state, further, execution authority of an action for guidance of the first kind avatar arranged in the virtual space to the match-making for the match game, is given to the second kind avatar, in case of execution of the action for guidance, the action control unit selects the first kind avatar which is not in the match playing state, as an object of the guidance, when the action for guidance is performed by the action control unit, the management unit makes the first kind avatar, which is an object of the guidance, shift to a state where an action related to the match-making for the match game with another first kind avatar is started.

4. The match-making system according to claim 3, wherein the action related to the establishment of the match-making for the match game is started on condition that the first kind avatar is arranged at a predetermined position in the virtual space, and when the action for guidance is performed by the action control unit, the management unit changes the first kind avatar, which is the object of the guidance, to a state where the first kind avatar is arranged at the predetermined position.

5. The match-making system according to either claim 3, further including an identification unit, which identifies a first kind avatar related to a user who is estimated as hesitating about game play of the match game among the first kind avatars which are not in the match playing state, wherein the action control unit selects the first kind avatar identified by the identification unit, as the first kind avatar which is the object of the guidance.

6. The match-making system according to claim 5, wherein execution authority for performing a movement and transmittance of a message based on an operation performed to the information communication terminal related to the first kind avatar, is given to the first kind avatar, and the identification unit identifies the first kind avatar which moves within a predetermined period in the virtual space and does not transmit a message in response to the message transmitted by other first kind avatar, from among first kind avatars which are not in the match playing state.

7. The match-making system according to claim 3, further including a second accepting unit which accepts a connection from an information communication terminal of an administrator of the service, wherein the action control unit controls an action of the second kind avatar based on an operation performed to the information communication terminal of the administrator.

8. The match-making system according to claim 7, further including a unit which makes suggestion to the information communication terminal of the administrator about the first kind avatar to be ejected from the virtual space.

9. The match-making system according to claim 7, further including a unit which makes a suggestion to the information communication terminal of the administrator about the first kind avatar to be selected as the object of the guidance.

10. The match-making system according to claim 1, wherein the management unit sets a plurality of virtual spaces for providing the service, and at least one second kind avatar is arranged in each of the plurality of virtual spaces.

11. A computer-readable non-transitory storage media storing program for causing a computer, which provides communication through avatars arranged in a virtual space and a match-making service for a match game, to perform processing comprising the following steps of:

accepting a connection from an information communication terminal of a user of the service; assigning a first kind avatar, which is an object of match-making for the match game, to the user of the information communication terminal, which is connected thereto;

movably arranging the first kind avatar assigned to the user by the assignment unit and a second kind avatar, which is not subject to the match-making for the match game, in the virtual space, and managing states thereof;

controlling an action of the second kind avatar in the virtual space; and causing a display unit of the connected information communication terminal to display the virtual space, based on states information of the managed first kind avatar and the second kind avatar so that the first kind avatar and the second kind avatar are distinguishable, wherein execution authority for an action related to establishment of the match-making for the match game with the other first kind avatar, is given to the first kind avatar, instead of not giving the execution authority for an action related to establishment of the match-making for the match game with the first kind avatar arranged in the virtual space, execution authority for an action for arbitrarily ejecting the first kind avatar from the virtual space, is given to the second kind avatar and stopping arranging the first kind avatar, which is subject to an ejection, in the virtual space when an action for the ejection is performed by the action control unit.

12. An information communication terminal which is connected to a match-making system for providing communication through avatars arranged in a virtual space and a service of match-making for a match game, as a user, wherein the match-making system comprises a first accepting unit which accepts a connection from an information communication terminal of a user of the service; an assignment unit which assigns a first kind avatar, which is an object of the match-making for the match game, to the user of the information communication terminal, which is connected thereto: a management unit which movably arranges, in the virtual space, the first kind avatar assigned to the user by the assignment unit and a second kind avatar, which is not subject to the match-making for the match game, and manages states thereof; an action control unit which controls an action of the second kind avatar in the virtual space; and a display control unit which causes a display unit of the connected information communication terminal to display the virtual space, based on state information of the first kind avatar and the second kind avatar managed by the management unit, so that the first kind avatar and the second kind avatar are distinguishable, wherein execution authority of an action related to establishment of the match-making for the match game with another first kind avatar, is given to the first kind avatar, instead of not giving the execution authority of the action related to establishment of the match-making for the match game with the first kind avatar arranged in the virtual space, execution authority of an action for arbitrarily ejecting the first kind avatar from the virtual space, is given to the second kind avatar, and the management unit stops arranging the first kind avatar, which is subject to an ejection, in the virtual space when an action for the ejection is performed by the action control unit, comprising:

the display unit; and an operation input unit which accepts an operation related to an action of the first kind avatar.

13. An information communication terminal which is connected to a match-making system for providing communication through avatars arranged in a virtual space and a service of match-making for a match game, as an administrator, wherein the match-making system comprises a first accepting unit which accepts a connection from an information communication terminal of a user of the service; an assignment unit which assigns a first kind avatar, which is an object of the match-making for the match game, to the user of the information communication terminal, which is connected thereto; a management unit which movably arranges, in the virtual space, the first kind avatar assigned to the user by the assignment unit and a second kind avatar, which is not subject to the match-making for the match game, and manages states thereof; an action control unit which controls an action of the second kind avatar in the virtual space; and a display control unit which causes a display unit of the connected information communication terminal to display the virtual space, based on state information of the first kind avatar and the second kind avatar managed by the management unit, so that the first kind avatar and the second kind avatar are distinguishable, wherein execution authority of an action related to establishment of the match-making for the match game with another first kind avatar, is given to the first kind avatar, instead of not giving the execution authority of an action related to establishment of the match-making for the match game with the first kind avatar arranged in the virtual space, execution authority of an action for arbitrarily ejecting the first kind avatar from the virtual space, is given to the second kind avatar, and the management unit stops arranging the first kind avatar, which is subject to an ejection, in the virtual space when an action for the ejection is performed by the action control unit, wherein when the match-making for the match game is established among a predetermined number of the first kind avatars the management unit manages a state of the predetermined number of the first kind avatars, as a match playing state, further, execution authority of an action for guidance of the first kind avatar arranged in the virtual space to the match-making for the match game, is given to the second kind avatar, in case of execution of the action for guidance, the action control unit selects the first kind avatar which is not in the match playing state, as an object of the guidance, when the action for guidance is performed by the action control unit, the management unit makes the first kind avatar, which is an object of the guidance, shift to a state where an action related to the match-making for the match game with another first kind avatar is started, and wherein the match-making system further includes a second accepting unit which accepts a connection from an information communication terminal of the administrator of the service, wherein the action control unit controls the action of the second kind avatar based on an operation performed to the information communication terminal of the administrator, comprising:

the display unit; and an operation input unit which accepts an operation related to the action of the second kind avatar.

14. A server for providing communication through avatars arranged in a virtual space and a match-making service for a match game, comprising:

a first accepting unit which accepts a connection from an information communication terminal of a user of the service;

an assignment unit which assigns a first kind avatar, which is an object of match-making for the match game, to the user of the information communication terminal, which is connected thereto;

a management unit which movably arranges the first kind avatar assigned to the user by the assignment unit and a second kind avatar, which is not subject to the match-making for the match game, in the virtual space, and manages states thereof;

an action control unit which controls an action of the second kind avatar in the virtual space; and a display control unit which causes a display unit of the connected information communication terminal to display the virtual space, based on state information of the first kind avatar and the second kind avatar, which are managed by the management unit, so that the first kind avatar and the second kind avatar are distinguishable, wherein execution authority for an action related to establishment of the match-making for the match game with another first kind avatar, is given to the first kind avatar, instead of not giving the execution authority for an action related to establishment of the match-making for the match game with the first kind avatar arranged in the virtual space to the second kind avatar, execution authority for an action to arbitrarily eject a first kind avatar from the virtual space, is given to the second kind avatar, and the management unit stops arranging the first kind avatar, which is subject to an ejection, in the virtual space when an action for the ejection is performed by the action control unit.

* * * * *